United States Patent
Okano et al.

(10) Patent No.: US 7,781,070 B2
(45) Date of Patent: *Aug. 24, 2010

(54) ANTIREFLECTION FILM, MANUFACTURING METHOD OF ANTIREFLECTION FILM, HARD COAT FILM, POLARIZING PLATE AND DISPLAY

(75) Inventors: Satoshi Okano, Tokyo (JP); Yoshikazu Ojima, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 1 day.

This patent is subject to a terminal disclaimer.

(21) Appl. No.: 12/279,935

(22) PCT Filed: Feb. 16, 2007

(86) PCT No.: PCT/JP2007/052842

§ 371 (c)(1),
(2), (4) Date: Aug. 19, 2008

(87) PCT Pub. No.: WO2007/097258

PCT Pub. Date: Aug. 30, 2007

(65) Prior Publication Data

US 2009/0002820 A1    Jan. 1, 2009

(30) Foreign Application Priority Data

Feb. 22, 2006   (JP)   ............................ 2006-045072

(51) Int. Cl.
*B32B 27/30* (2006.01)
*B05D 3/00* (2006.01)
*G02B 27/00* (2006.01)

(52) U.S. Cl. ........................ 428/522; 428/323; 427/401; 359/483

(58) Field of Classification Search ................ 428/522, 428/323; 427/401; 359/483
See application file for complete search history.

(56) References Cited

U.S. PATENT DOCUMENTS

| 6,228,499 B1 * | 5/2001 | Nakauchi et al. ............ 428/412 |
| 2006/0181774 A1 * | 8/2006 | Ojima et al. ................ 359/586 |

FOREIGN PATENT DOCUMENTS

| JP | 2004114355 | | 4/2004 |
| JP | 2004361662 | | 12/2004 |
| JP | 2005-157037 | * | 6/2005 |
| JP | 2005283786 | | 10/2005 |

\* cited by examiner

*Primary Examiner*—Gwendolyn Blackwell
(74) *Attorney, Agent, or Firm*—Lucas & Mercanti, LLP

(57) ABSTRACT

An antireflection film comprising a hard coat layer and an antireflection layer on at least one side of a transparent resin film, wherein the hard coat layer contains a polyoxyethylene oleyl ether compound and an actinic ray curable resin.

13 Claims, No Drawings

ANTIREFLECTION FILM, MANUFACTURING METHOD OF ANTIREFLECTION FILM, HARD COAT FILM, POLARIZING PLATE AND DISPLAY

This is a U.S. National Phase Application under 35 U.S.C. 371 of International Application PCT/JP2007/052842, filed on Feb. 16, 2007.

This Application claims the priority of Japanese Application No. 2006-045072, filed Feb. 22, 2006, the entire content of which is hereby incorporated by reference.

FIELD OF THE INVENTION

The present invention relates to an antireflection film a manufacturing method of the antireflection film, a hard coat film, a polarizing plate and a display.

BACKGROUND OF THE INVENTION

In recent years, primarily in the fields of an optical lens, a plasma display panel (PDP), a cathode tube display (CRT) and a liquid crystal display of such as a computer and a word processor, proposed is an antireflection film having an antireflection layer for improvement of transmittance and contrast and for decrease of mirrored images. As for an antireflection layer, it is effective to decrease optical reflection at the interface between an accumulated substance and the air by accumulating a few layers having suitable values of a refractive index and an optical thickness as an optical interference layer. As an optical interference layer, provided is a low refractive index layer in which such as $SiO_2$ and $MgF_2$ as a low refractive index material is utilized.

An antireflection film can be manufactured by a dry casting method or a coating casting method, however, a coating casting method is generally utilized with respect to an advantage of easiness and a low cost. Further, the antireflection film is generally provided with hard coat property to give capabilities of such as anti-scratch property, anti-abrasion property and chemical resistance, by forming a hard coat layer as an intermediate layer on a film substrate. A hard coat layer generally comprises a ultraviolet curable resin to give hard coat property, and a ultraviolet curable (meth)acrylate monomer having a (meth)acryloyl group is primarily utilized. Further, in a hard coat layer, a fluorine or silicone surfactant, which has a great effect to decrease surface tension of a coating solution, is utilized to give an even surface and to prevent surface defects such as repelling and missing. However, in a hard coat layer utilizing the aforesaid (meth)acrylate monomer together with a fluorine or silicone surfactant, there caused a problem of adhesion (blocking) of the surfaces each other and abrasion on a hard coat surface when a hard coat layer and a surface without a hard coat layer (such as a back coat layer) are accumulated or hard coat film is stored in a state of a wound roll form, for example, under an environment supposing a season of high temperature and high humidity of a summer; there caused a problem of generation of spotty unevenness without forming an even surface in the case of forming antireflection film by coating an antireflection layer on the hard coat layer having been suffered from blocking; or there caused a problem of decreased adhesion property of an antireflection layer when antireflection film is prepared by utilizing a fluorine or silicone surfactant in a hard coat layer. Thereby deterioration of a product value and productivity were induced and rapid solution thereof has been desired.

A technology of a vinylidene chloride resin type water-based coating agent containing such as hydrophilic inorganic powder is known as an anti-blocking agent (please refer to, for example, Patent Documents 1 and 2). However, a sufficient effect has not been achieved with respect to an anti-blocking effect, a coating behavior of a hard coat layer (surface defects such as repelling and missing) and adhesion property of an antireflection layer. In Patent Document 3, a technology to incorporate ionization radiation curable resin and a nonionic surfactant in a hard coat layer is disclosed. However, there is no description on a compound of this invention in the aforesaid document, and the aforesaid nonionic surfactant is difficult to achieve compatibility of an anti-blocking effect and adhesion property of antireflection layer.

Patent Document 1: JP-A 5-132645 (Hereinafter, JP-A refers to Unexamined Japanese Patent Application Publication No.)

Patent Document 2: JP-A 9-291250

Patent Document 3: JP-A 2004-114355

SUMMARY OF THE INVENTION

Problems to be Solved by this Invention

This invention has been made in view of the above-described problems, and the object is to provide an antireflection film which has a hard coat layer prevented from blocking trouble and has an antireflection layer free from appearance abnormality such as spotty unevenness and having satisfactory adhesion; a manufacturing method of antireflection film, and a polarizing plate and a display utilizing the antireflection film or the hard coat film.

Means to Solve the Problems

The above-described object of this invention can be achieved by the following constitutions.

Item 1. An antireflection film comprising a hard coat layer and an antireflection layer on at least one side of a transparent resin film, wherein the hard coat layer at least contains a polyoxyethylene oleyl ether compound and an actinic ray curable resin.

Item 2. The antireflection film described in aforesaid item 1, wherein the aforesaid antireflection layer has a low refractive index layer.

Item 3. The antireflection film described in aforesaid item 2, wherein the aforesaid low refractive index layer contains hollow silica type micro-particles.

Item 4. The antireflection film described in any one of aforesaid items 1-3, wherein the aforesaid polyoxyethylene oleyl ether compound is represented by following Formula 1 and n is 2-9.

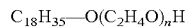   Formula 1

Item 5. A manufacturing method of the antireflection film described in any one of aforesaid items 1-4 comprising the steps of:

(i) forming the hard coat layer by coating on one side of the transparent resin film, (ii) winding the coated film in a roll form, and (iii) unwinding again to coat an antireflection layer on the hard coat layer.

Item 6. An antireflection film being manufactured by the manufacturing method of the antireflection film described in aforesaid item 5.

Item 7. A hard coat film having a hard coat layer at least on one side of a transparent resin film, wherein the hard coat layer contains at least a polyoxyethylene oleyl ether compound and an actinic ray curable resin.

Item 8. A polarizing plate comprising an antireflection film described in any one of aforesaid items 1-4, an antireflection film described in aforesaid item 6, or a hard coat film described in aforesaid item 7, on at least one side of a polarizer.

Item 9. A display comprising an antireflection film described in any one of aforesaid items 1-4, an antireflection film described in aforesaid item 6, a hard coat film described in aforesaid item 7, or a polarizing plate described in aforesaid item 8.

EFFECTS OF THE INVENTION

This invention can provide an antireflection film which has a hard coat layer prevented from a blocking trouble and has an antireflection layer free from appearance abnormality such as spotty unevenness and having satisfactory adhesion; a manufacturing method of the antireflection film; a hard coat film; a polarizing plate and a display employing the antireflection film or the hard coat film.

DETAILED DESCRIPTION OF THE INVENTION

In the following, the best embodiment to practice this invention will be detailed, however, this invention is not limited thereto.

In this invention, it has been found that an antireflection film, which has a hard coat layer prevented from a blocking trouble and has an antireflection layer free from appearance abnormality such as spotty unevenness and having satisfactory adhesion, can be obtained by an antireflection film which has a hard coat layer and an antireflection layer at least on one side of a transparent resin film, wherein the hard coat layer contains at least a polyoxyethylene oleyl ether compound and an actinic ray curable resin.

Further, it has been found together that the aforesaid antireflection film is preferably manufactured by a manufacturing method of the antireflection film, wherein a transparent resin film, at least one side of which a hard coat layer is formed by coating, is wound in a roll form followed by being unwound to coat an antireflection layer on the hard coat layer.

In the following, this invention will be detailed.

A polyoxyethylene oleyl ether compound is a compound referred to as a nonionic surfactant, which is generally represented by formula (1). In the following, formula (1) will be explained.

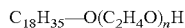    Formula (1)

wherein, n is 2-40.

A mean addition number (n) of ethylene oxide against the above-described oleyl portion is 2-40, preferably 2-10, more preferably 2-9 and still more preferably 2-8. Further, a compound of Formula (1) can be prepared by reacting ethylene oxide with oleyl alcohol, as a conventional manner.

Specific compounds include such as Emargen 404 [polyoxyethylene(4) oleyl ether], Emargen 408 [polyoxyethylene(8) oleyl ether], Emargen 409P [polyoxyethylene(9) oleyl ether], Emargen 420 [polyoxyethylene(13) oleyl ether], and Emargen 430 [polyoxyethylene(30) oleyl ether], all manufactured by Kao Corp.; and NOFABLE EAO-9905 manufactured by Nippon Oil & Fat Co., Ltd. [polyoxyethylene(5) oleyl ether]. Herein, the number in ( ) indicates above-described "n".

The addition amount of a polyoxyethylene oleyl ether compound is preferably in a range of 0.1-8.0 weight % based on an electron beam curable (meth)acrylate monomer having a (meth)acryloyl group as an example of a preferable actinic ray curable resin, which will be described later, and more preferably in a range of 0.2-4.0 weight %; an antireflection layer prevented from blocking trouble of a hard coat layer and free from appearance abnormality such as spotty unevenness of an antireflection layer and having satisfactory adhesion can be provided in the above-mentioned range.

(Antireflection Layer)

An antireflection layer based on optical interference utilized in the antireflection film of this invention will now be explained.

(Constitution of Antireflection Layer)

An antireflection layer utilized in this invention may have a single layer structure comprising only a low refractive index layer or may have a multi-layer structure comprising at least one low refractive index layer and at least one high refractive index layer. Further, a multi-layer refractive index layer comprising not less than 3 layers is also possible.

The refractive index layers can be laminated on the surface of a transparent film support, which is provided with a hard coat layer (a clear hard coat layer or an antiglare layer), so as to reduce reflectivity by optical interference in consideration of such as a refractive index, a layer thickness, a number of layers and an order of layers. An antireflection layer is preferably constituted of a high refractive index layer having a higher refractive index than the support and a low refractive index layer having a lower refractive index than the support, in combination; and is specifically preferably an antireflection layer constituted of not less than 3 layers of refractive index layers and preferably comprises 3 layers having different refractive indexes accumulated in the order of a medium refractive index layer (a layer having a refractive index higher than a hard coat layer or a support but lower than a high refractive index layer)/a high refractive index layer/a low refractive index layer from the support side. A hard coat layer may be simultaneously utilized as a high refractive index layer.

Examples of a preferable layer constitution of the antireflection film of this invention will be shown below. Herein, "/" indicates that a layer is arranged by accumulation. A support referred in this invention is a transparent resin film which will be described later.

Back coat layer/transparent resin film/hard coat layer/low refractive index layer Back coat layer/transparent resin film/hard coat layer/high refractive index layer/low refractive index layer Back coat layer/transparent resin film/hard coat layer/medium refractive index layer/high refractive index layer/low refractive index layer Back coat layer/transparent resin film/antistatic layer/hard coat layer/medium refractive index layer/high refractive index layer/low refractive index layer Antistatic layer/transparent resin film/hard coat layer/medium refractive index layer/high refractive index layer/low refractive index layer Back coat layer/transparent resin film/hard coat layer/high refractive index layer/low refractive index layer/high refractive index layer/low refractive index layer An anti-stain layer may be provided on the outermost low refractive index layer so as to make easy wipe-off of dirt and finger print. As an antistain layer, a fluorine-containing compound is preferably utilized.

(Hard Coat Layer)

In this invention, a hard coat layer is coated at least on one side of the transparent resin film.

In this invention, a film coated with a hard coat layer is referred to as a hard coat film. The hard coat layer is characterized by containing at least the aforesaid polyoxyethylene oleyl ether compound and the actinic ray curable resin.

The actinic ray curable resin comprises a resin, which is cured through such as a cross-linking reaction by actinic ray irradiation of such as ultraviolet rays and electron rays, as a primary component As an actinic ray curable resin, a component containing a monomer having an ethylenic unsaturated double bond is preferably utilized, which is irradiated with irradiation of actinic rays such as ultraviolet rays and electron rays to be cured to form a hard coat layer. The actinic ray curable resin includes such as a ultraviolet ray curable resin and an electron ray curable resin as typical examples, however, a resin which is curable with ultraviolet ray irradiation is preferred.

As a ultraviolet ray curable resin, such as an ultraviolet curable urethane acrylate type resin, an ultraviolet curable polyester acrylate type resin, an ultraviolet curable epoxy acrylate type resin, an ultraviolet curable polyol acrylate type resin, or an ultraviolet curable epoxy resin, is preferably utilized.

An ultraviolet ray curable urethane acrylate type resin can be easily prepared generally by making a product, which is prepared by making polyesterpolyol to react with an isocyanate monomer or a prepolymer, to further react with an acrylate type monomer having a hydroxyl group such as 2-hydroxyethyl acrylate, 2-hydroxyethyl methacrylate (hereinafter, only acrylate is described so that acrylate includes methacrylate) and 2-hydroxypropyl acrylate. For example, those described in JP-A 59-151110 can be utilized.

For example, a mixture of 100 parts of Unidic 17-806 (manufactured by Dainippon Ink & Chemicals, Inc.) and 1 part of Coronate L (manufactured by Nippon Polyurethane Co., Ltd.) is preferably utilized.

An ultraviolet ray curable polyester acrylate type resin includes those easily prepared by allowing polyester polyol to react with a 2-hydroxyethyl acrylate or a 2-hydroxyacrylate type monomer, and those described in JP-A 59-151112 can be utilized.

Specific examples of the ultraviolet ray curable epoxy acrylate type resin include those prepared by employing epoxy acrylate as oligomer and adding and allowing to react with a reactive diluent and a photoreaction initiator, and those described in JP-A 1-105738 can be utilized.

Specific examples of the ultraviolet ray curable polyol acrylate type resin include such as trimethylolpropane triacrylate, ditrimethylolpropane tetraacrylate, pentaerythritol triacrylate, pentaerythritol tetraacrylate, dipentaerythritol hexaacrylate and alkyl modified dipentaerythritol pentaacrylate.

Specific examples of a photoreaction initiator of these ultraviolet ray curable resins include such as benzoin and derivatives thereof, acetophenone, benzophenone, hydroxybenzophenone, Michler's ketone, α-amyloxime ester and thioxantone and derivatives thereof. These may be utilized together with an optical sensitizer. The above-described photoreaction initiators can be also utilized as an optical sensitizer. Further, a sensitizer such as n-butylamine, triethylamine and tri-n-butylphosphine can be utilized when an epoxy acrylate type photoreaction initiator is utilized. A photoreaction initiator or a photosensitizer utilized in an ultraviolet ray curable resin composition is incorporated at 0.1-15 weight parts and preferably 1-10 weight parts against 100 parts of the composition.

Examples of the other ultraviolet ray curable acrylate resin include ordinary monomers such as methyl acrylate, ethyl acrylate, isopropyl acrylate, butyl acrylate, benzyl acrylate, cyclohexyl acrylate, vinyl acetate and styrene, having one unsaturated double bond. Further, listed are such as ethyleneglycol diacrylate, propyleneglycol diacrylate, divinylbenzene, 1,4-cyclohexane diacrylate, 1,4-cyclohexyldimethyl diacrylate, having not less than two unsaturated bonds.

As a product of the ultraviolet ray curable resin available on the market which can be utilized in this invention, utilized can be by appropriate selection from such as Adekaoptomer KR•BY siries: KR-400, KR-410, KR-550, KR-566, KR-567 and BY-3202 (manufactured by Asahi Denka Kogyo K.K.); Koeihard A-101-KK, A-101-WS, C-302, C-401-N, C-501, M-101, M-102, T-102, D-102, NS-101, FT-102Q8, MAG-1-P20, AG-106 and M-101-C (manufactured by Koei Chemical Co., Ltd.); Seikabeam PHC2210 (S), PHC X-9(K-3), PHC2213, DP-10, DP-20, DP-30, P1000, P1100, P1200, P1300, P1400, P1500, P1600, SCR900 (manufactured by Dainichiseika Colour & Chemicals Mfg. Co., Ltd.); KRM7033, KRM7039, KRM7130, KRM7131, UVECRYL29201 and UVECRYL29202 (manufactured by Daicel Cytec Co., Ltd.); RC-5015, RC-5016, RC-5020, RC-5031, RC-5100, RC-5102, RC-5120, RC-5122, RC-5152, RC-5171, RC-5180 and RC-5181 (manufactured by Dainippon Ink & Chemicals, Inc.); Aurex No. 340 Clear (manufactured by Chugoku Marine Paints, Ltd.); Sunrad H-601, RC-750, RC-700, RC-600, RC-500, RC-611 and RC-612 (manufactured by Sanyo Chemical Industries, Ltd.); SP-1509 and SP-1507 (manufactured by Showa Highpolymer Co., Ltd.); RCC-15C (manufactured by Grace Japan Co., Ltd.); Alonix M-6100, M-8030 and M-8060 (manufactured by Toa Gosei Co., Ltd.).

Listed as specific examples are such as pentaerythritol tetrakisthioglycolate and trismercaptopropyl isocianurate.

These actinic ray curable resin layers can be coated by a method well known in the art such as a method employing a gravure coater, a dip coater, a reverse coater, a wire bar coater, a die coater and an inkjet method.

As a light source to cure ultraviolet ray curable resin by a photocuring reaction and to form a cured film layer, light sources provided generating ultraviolet rays can be utilized without limitation. For example, a low pressure mercury lamp, a medium pressure mercury lamp, a high pressure mercury lamp, an ultrahigh pressure mercury lamp, a carbon arc lamp, a metal halide lamp or a xenon lamp can be utilized. An irradiation condition differs depending on a type of the lamp; however, irradiation quantity of actinic rays is preferably 5-500 mJ/cm$^2$ and specifically preferably 150 mJ/cm$^2$.

Further, when actinic rays are irradiated, it is preferable to conduct irradiation while applying tension to film along the transport direction and more preferably while applying tension also along the width direction. The applied tension is preferably 30-300 N/m. A method to apply tension is not specifically limited, and tension may be applied on a back roll along the transport direction or may be applied by a tenter along the width direction or along the biaxial directions. Thereby, film having a more superior flatness can be prepared.

As an organic solvent for a coating solution of an ultraviolet ray curable resin layer composition, for example, hydrocarbons (such as toluene and xylene), alcohols (such as methanol, ethanol, isopropanol, butanol and cyclohexanol), ketones (such as acetone, methyl ethyl ketone and methyl isobutyl ketone), esters (such as methyl acetate, ethyl acetate and lactic acetate), glycol ethers, and other organic solvents, can be utilized by appropriate selection or by mixing them. The above-described organic solvent, which contains not less than 5 weight % and more preferably not less than 5-80 weight % of propyleneglycol monoalkyl ether (having a carbon number of an alkyl group of 1-4) or propyleneglycol monoalkyl ether acetic acid ester (having a carbon number of an alkyl group of 1-4), is preferably utilized.

In a coating method for a coating solution of an ultraviolet ray curable resin layer composition, a coating amount is suitably 1-30 μm and preferably 0.5-15 μm based on a wet layer thickness. Further, a dry layer thickness is 0.1-20 μm and preferably 1-20 μm. It is specifically preferably 5-20 m.

Further, a hard coat layer having a pencil hardness of 2H-8H is preferred. When the pencil hardness of the antireflection film or the hard coat film is 2H-8H, it can be regarded as an antireflection film or a hard coat film having a hard coat layer. The pencil hardness is specifically preferably 3H-6H. Pencil hardness is a value measured based on a pencil hardness evaluation method defined by JIS K 5400 by use of a test pencil defined by JIS S 6006 after a hard coat film sample has been rehumidified under a condition of a temperature of 25° C. and a relative humidity of 60% for 2 hours.

An ultraviolet ray curable resin composition is irradiated with ultraviolet rays preferably during or after coating and drying, and irradiation time to obtain the aforesaid irradiation quantity of actinic rays of 5-500 mJ/cm$^2$ is preferably 0.1 second-5 minutes, and more preferably 0.1-10 seconds with respect to curing efficiency of the ultraviolet ray curable resin or working efficiency.

Further, illuminance of these actinic ray irradiation portions is preferably 50-500 mW/cm$^2$ and more preferably 50-150 mW/cm$^2$.

A hard coat layer prepared in this manner may be also added with micro-particles of an inorganic compound or an organic compound, to prevent blocking, to enhance anti-abrasion resistance, to provide anti-glare property and light diffusing property, or to control refractive index.

Inorganic micro-particles utilized in a hard coat layer include silicon oxide, titanium oxide, aluminum oxide, zirconium oxide, magnesium oxide, calcium oxide, calcium carbonate, magnesium carbonate, talc, clay, burned kaolin, burned calcium silicate, calcium silicate hydrate, aluminum silicate, magnesium silicate and calcium phosphate. Such as silicon oxide, titanium oxide, aluminum oxide, zirconium oxide and magnesium oxide are specifically preferably utilized.

Further, as organic micro-particles, polymethacrylic methyl acrylate resin powder, acrylstyrene type resin powder, polymethyl methacrylate resin powder, silicone type resin powder, polystyrene type resin powder, polycarbonate resin powder, benzoguanamine type resin powder, meramine type resin powder, polyolefin type resin powder, polystyrene type resin powder, polyamide type resin powder, polyimide type resin powder or polyfluoroethylene type resin powder can be incorporated in an ultraviolet ray curable resin composition. Specifically preferably listed are cross-linked polystyrene particles (such as SX-130H, SX-200H and SX-350H, manufactured by Soken Chemical & Engineering Co., Ltd.) and polymethyl methacrylate type particles (such as MX150 and MX-300, manufactured by Soken Chemical & Engineering Co., Ltd.). In addition, such as a silane coupling agent may be added as an additive into the low refractive index layer which will be described below.

A primary particle size of these micro-particle powder is 0.005-5 μm and specifically preferably 0.01-3 μm, and it is preferable to incorporate two types having different primary particle size and refractive index. A primary particle size can be determined by a particle size analyzer such as Multisizer 3 (manufactured by Beckman Coulter Co., Ltd.) and ELS-Z2 (manufactured by Otsuka Electronics Co., Ltd.).

Further, a value of Ra/Sm, which is determined from mean length Sm of an outline curve element defined by JIS B 0601, is preferably not more than 0.008.

Center line mean roughness (Ra) is preferably measured by a surface roughness meter of an optical interference type, and for example, can be measured by use of RST/PLUS manufactured by WYKO Co., Ltd.

Further, an ultraviolet ray curable resin layer, which is provided with anti-glare property by forming an ultraviolet ray curable resin layer having roughness on the surface or by forming roughness on the surface by an inkjet method or a printing method, is preferably utilized.

(Back Coat Layer)

It is preferable to arrange a back coat layer on the surface opposite to the side, on which a hard coat layer is provided, of the hard coat film of this invention. A back coat layer is arranged to correct curl generated by providing a hard coat layer or other layers by means of coating or CVD. That is, it is possible to balance the degree of curling by providing a property to be rolled while making the surface having a hard coat layer inside. Herein, a back coat layer is preferably coated so as to function also as an anti-blocking layer, and in this case, a back coat layer coating composition is preferably added with micro-particles to provide an anti-blocking function.

Examples of inorganic micro-particles added in a back coat layer include silicon oxide, titanium oxide, aluminum oxide, zirconium oxide, calcium carbonate, magnesium carbonate, talc, clay, burned kaolin, burned calcium silicate, tin oxide, indium oxide, zinc oxide, ITO, calcium silicate hydrate, aluminum silicate, magnesium silicate and calcium phosphate. Micro-particles containing silicon are preferable with respect to decreased haze, and silicon dioxide is specifically preferable.

These micro-particles are available on the market under names of such as Aerosil R972, R972V, R974, R812, 200, 200V, 300, R202, OX50 and TT600 (manufactured by Nippon Aerosil Co., Ltd.); KEP-10, KEP-30 and KEP-50 (manufactured by Nippon Shokubai Co., Ltd.), which can be utilized. Micro-particles of zirconium oxide are available under product names of Aerosil R976 and R811, which can be utilized. Examples of polymer micro-particles include silicone resin, fluorine resin and acrylic resin. Silicone resin is preferable and those having a three dimensional network structure are preferable and available on the market under product names of such as Tosperl 103, 105, 108, 120, 145, 3120 and 240 (manufactured by Toshiba Silicone Co., Ltd.), which can be utilized.

Among them, specifically preferably utilized are Aerosil 200V and Aerosil R972V because of a large anti-blocking effect while keeping low haze. Hard coat film utilized in this invention preferably has a dynamic friction coefficient for the back side of a hard coat layer of not more than 0.9 and specifically preferably of 0.1-0.9.

Micro-particles in a back coat layer is contained at 0.1-50 weight % and preferably 0.1-10 weight % against a binder. Increase of haze when a back coat layer is provided is not more than 1% preferably not more than 0.5% and specifically preferably 0.0-0.1%.

It is preferable to form a back coat layer specifically by coating a composition containing a solvent to dissolve or swell transparent resin film. A solvent incapable of dissolving transparent resin film in addition to a solvent capable of dissolving and/or a solvent capable of swelling may be contained depending on the solvent utilized, and employed are a composition and a coating amount, in which these are mixed in an appropriate ratio depending on the degree of curl and the type, of resin of transparent resin film.

In the case of enhancing the anti-curl function, it is effective to increase a mixing ratio of a solvent capable of dissolution and/or a solvent capable of swelling and to decrease a ratio of a solvent incapable of dissolution in a utilized solvent composition. This mixing ratio is preferably (a solvent capable of dissolution and/or a solvent capable of swelling)/(a solvent incapable of dissolution)=10/0-1/9. A solvent to dissolve or to swell transparent resin film contained in such a mixed composition includes such as dioxane, acetone, methyl ethyl ketone, N,N-dimethylformamide, methyl acetate, ethyl acetate, trichloroethylene, methylene chloride, ethylene chloride, tetrachloroethane, trichloroethane and chloroform. A solvent incapable of dissolution includes such as methanol, ethanol, n-propyl alcohol, i-propyl alcohol, n-butanol or hydrocarbons (toluene, xylene and cyclohexanol).

These coating compositions are preferably coated on the surface of transparent resin film at a wet layer thickness of 1-100 μm and specifically preferably of 5-30 μm, by use of such as a gravure coater, a dip coater, a reverse coater, a wire-bar coater and a die coater. A resin utilized as a binder in a back coat layer includes, vinyl type polymer or copolymer such as vinyl chloride, vinyl chloride-vinyl acetate copolymer, vinyl chloride resin, vinyl acetate resin, copolymer of vinyl acetate and vinyl alcohol, partially saponificated vinyl chloride-vinyl acetate copolymer, vinyl chloride-vinylidene chloride copolymer, vinyl chloride-acrylonitrile copolymer, ethylene-vinyl alcohol copolymer, chlorinated polyvinyl chloride, ethylene-vinyl chloride copolymer and ethylene-vinyl acetate copolymer; cellulose derivatives such as nitrocellulose, cellulose acetate propionate (preferably having an acetyl group substitution degree of 1.8-2.3 and a propionyl group substitution degree of 0.1-1.0), diacetyl cellulose and cellulose acetate butyrate resin; copolymer of maleic acid and/or acrylic acid, acrylicester copolymer, acryronitrile-styrene copolymer, chlorinated polyethylene, acrylonitrile-chlorinated polyethylene-styrene copolymer, methylmethacrylate-butadiene-styrene copolymer, acrylic resin, polyvinyl acetal resin, polyvinyl butyral resin, polyester polyurethane resin, polyether polyurethane resin, polycarbonate polyurethane resin, polyester resin, polyether resin, polyamide resin, amino resin, styrene-butadiene resin, rubber type resin such as butadiene-acrylonitrile resin, silicone type resin and fluorine type resin; however, is not limited thereto. For example, as acrylic resin, available on the market are various types homopolymer and copolymer prepared from acryl and methacryl type monomer as a starting material, such as Acrypet MD, VH, MF and V (manufactured by Mitsubishi Rayon Co., Ltd.); Hiparl M-4003, M-4005, M-4006, M4202, M-5000, M-5001 and M-4501 (manufactured by Negami Chemical Industrial Co., Ltd.); Dianal BR-50, BR-52, BR-53, BR-60, BR-64, BR-73, BR-75, BR-77, BR-79, BR-80, BR-82, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, BR-117 and BR-118 (manufactured by Mitsubishi Rayon Co., Ltd.); and it is possible to select a suitable one among them. Further, a surfactant such as a fluorine type surfactant, which will be described in the following low refractive index layer, may be incorporated.

Specifically preferable is a cellulose type resin layer such as diacetyl cellulose and cellulose acetate propionate.

The order to coat a back coat layer may be either before or after coating of the layer opposite to the back coat layer (a hard coat layer or other layers such as an antistatic layer) on an antireflection layer, however, a back coat layer is preferably coated previously in the case that a back coat layer functions also as an anti-blocking layer. It is also possible to coat a back coat layer in not less than two times before and after coating of a hard coat layer.

(Antireflection Layer)

Next, an antireflection layer according to this invention will be explained.

In this invention, by accumulating a high refractive index layer or a low reflective index layer on a specific hard coat layer, as an antireflection layer, it is surprising to have improved visual appearance characteristics and adhesion of the antireflection layer.

First, a high refractive index layer preferable in this invention will be explained.

(High Refractive Index Layer or Medium Refractive Index Layer)

(Metal Oxide Micro-particles in High Refractive Index Layer or Medium Refractive Index Layer)

Metal oxide micro-particles are preferably contained in a high refractive index layer utilized in this invention. The type of metal oxide micro-particles is not specifically limited and metal oxide having at least one element selected from Ti, Zr, Sn, Sb, Cu, Fe, Mn, Pb, Cd, As, Cr, Hg, Zn, Al, Mg, Si, P and S can be utilized and these metal oxide micro-particles may be doped with a tiny amount of an atom such as Al, In, Sn, Sb, Nb, a halogen element and Ta. In this invention, at least one type of metal oxide micro-particles selected from zirconium oxide, antimony oxide, tin oxide, zinc oxide, indium-tin oxide (ITO), antimony doped tin oxide (ATO) and zinc antimonate is preferably utilized as a primary component and indium-tin oxide (ITO) and zinc antimonate are specifically preferable.

A mean particle size of primary particles of these metal oxide micro-particles is preferably in a range of 10-200 nm and more preferably 10-150 nm. A mean particle size of primary particles of metal oxide micro-particles can be measured from an electron microscopic photography by means of such as a scanning electron microscope. Aggregation is easily caused at the particle size of less than 10 nm to deteriorate dispersibility. It is not preferable because of remarkable increase of haze when the particle size exceeds 200 nm. The form of metal oxide micro-particles is preferably a rice particle shape, a spherical shape, a cubic shape, a spindle shape, a needle shape or an irregular shape.

A refractive index of a high refractive index layer is specifically not lower than a refractive index of transparent resin film as a support and is preferably in a range of 1.50-1.70 based on a measurement at 23° C. and a wavelength of 550 nm. A refractive index of metal oxide micro-particles is preferably 1.80-2.60 and more preferably 1.85-2.50 because a means to adjust a refractive index of a high refractive index layer is controlled by a type and an addition amount of metal oxide micro-particles.

Metal oxide micro-particles may be subjected to a surface treatment by an organic compound. By surface modification of the surface of metal oxide micro-particles with an organic compound, dispersion stability in an organic solvent is improved and control of a dispersed particle size becomes easy as well as aggregation by aging can be restrained. Therefore, a preferable surface modifying amount with an organic compound is 0.1-5 weight % against metal oxide micro-particles and more preferably 0.5-3 weight %. Examples of an organic compound utilized for the surface treatment include polyol, alkanolamine; stearic acid, a silane coupling agent and a titanate coupling agent. Among them, silane coupling agent described later is preferable. Surface treatments of at least two types may be combined.

Thickness of a high refractive index layer containing the aforesaid metal oxide micro-particles is preferably 5 nm-1 μm, more preferably 10 nm-0.2 μm and most preferably 30 nm-0.1 μm.

A ratio of metal oxide micro-particles utilized to a binder such as ionization radiation curable resin, which will be described later, differs depending on a type and a particle size of metal oxide micro-particles, however, is preferably around 2/1-1/2 based on a volume ratio.

A using amount of metal oxide micro-particles utilized in this invention is preferably 5-85 weight %, more preferably 10-80 weight % and most preferably 20-75 weight %, in a high refractive index layer. The effects of this invention can not be achieved when the using amount is less, while such as deterioration of film strength may be caused when it is excessive.

The above-described metal oxide micro-particles are supplied, as a state of dispersion comprising the particles having been dispersed in a medium, to a coating solution for formation of a high refractive index layer. As a dispersion medium for metal oxide particles, a liquid having a boiling point of 60-170° C. is preferably utilized. Specific examples of a dispersion medium include water, alcohol (for example, methanol, ethanol, isopropanol, butanol and benzyl alcohol), ketone (for example, acetone, methyl ethyl ketone, methyl isobutyl ketone and cyclohexanone), ketone alcohol (for example, diacetone alcohol), ester (for example, methyl acetate, ethyl acetate, propyl acetate, butyl acetate, methyl formate, ethyl formate, propyl formate and butyl formate), aliphatic hydrocarbon (for example, hexane and cyclohexane), hydrocarbon halogenide (for example, methylene chloride, chloroform and tetrachlorocarbon), aromatic hydrocarbon (for example, benzene, toluene and xylene), amide (for example, dimethyl formamide, dimethyl acetoamide and n-methylpyrrolidone), ether (for example, diethyl ether, dioxane and tetrahydrofuran) and ether alcohol (for example, 1-methoxy-2-propanol). Among them, toluene, xylene, methyl ethyl ketone, methyl isobutyl ketone, cyclohexanone and butanol are specifically preferable.

Further, metal oxide micro-particles can be dispersed in a medium by use of a homogenizer. Examples of a homogenizer include a sand grinder mill (such as a pin attached beads mill), a high speed impeller mill, a pebble mill, a roller mil, an atliter and a colloidal mill. A sand grinder mill and a high speed impeller ill are specifically preferable. Further, a preliminary dispersion process may be provided. Examples of a homogenizer employed for a preliminary dispersion process include a ball mill, a three-roll mill, a kneader and an extruder.

In this invention, metal micro-particles having a core/shell structure may be further incorporated. One layer of a shell may be formed around a core or plural shell layers may be formed to improve light-fastness. A core is preferably covered completely by a shell.

As a core, such as titanium oxide (such as a rutile type, an anatase type and an amorphous type), zirconium oxide, zinc oxide, selenium oxide, indium oxide doped with tin and tin oxide doped with antimony can be utilized, and titanium oxide of a rutile type may be utilized as a primary component.

The shell preferably contains an inorganic compound other than titanium oxide as a primary component and is preferably comprised of oxide or sulfide of metal. For example, utilized is an inorganic compound containing such as silicon dioxide (silica), aluminum oxide (alumina), zirconium oxide, zinc oxide, tin oxide, antimony oxide, indium oxide, iron oxide and zinc sulfide as a primary component. Among them, alumina, silica and zirconia (zirconium oxide) are preferable. Further, a mixture thereof may be also utilized.

A covering amount of a shell against a core is 2-50 weights, preferably 3-40 weight % and more preferably 4-25 weight %, based on a mean covering amount. A refractive index of micro-particles is decreased when a covering amount of a shell is excessive, while light fastness is deteriorated when it is excessively less. At least two types of inorganic micro-particles may be utilized in combination.

As titanium oxide to make a core, those prepared by a liquid phase method or a gas phase method can be utilized. Further, as a method to form a shell around a core, such as a method described in U.S. Pat. No. 3,410,708; Examined Japanese Patent Application Publication No. 58-47061; U.S. Pat. Nos. 2,885,366 and 3,437,502; British Patent No. 1,134, 249; U.S. Pat. No. 3,383,231; British Patent Nos. 2,629,953 and 1,365,999 can be utilized.

(Metal Compound)

In a high refractive index layer utilized in this invention, a compound, which is represented by following formula (2), or a chelate compound thereof is preferably utilized as a metal compound.

$$A_n MB_{x-n} \qquad \text{Formula (2)}$$

In the formula, M is a metal atom; A is a functional group capable of hydrolysis or a hydrocarbon group having a functional group capable of hydrolysis; and B is an atomic group which is covalent bonded or ionic bonded to metal atom M. x is an atomic valence of a metal atom and n is an integer of not less than 2 and not more than x.

Functional group A capable of hydrolysis includes such as an alkoxy group, a halogen atom such as a chlorine atom, an ester group and an amide group. A metal compound belonging to above formula (2) includes alkoxide, having not less than two alkoxy groups which directly bonds to a metal atom, and a chelate compound thereof. Preferable metal compounds include titanium alkoxide, zirconium alkoxide and chelate compounds thereof. Titanium alkoxide has a rapid reaction rate and a high refractive index as well as easy handling characteristics, however, deteriorates light fastness due to a photo-catalytic function when a great amount thereof is added. Zirconium alkoxide exhibits a high refractive index; however, it is necessary to pay attention with respect to such as dew point control at the time of coating due to the tendency of milky-whitening. Further, since titanium alkoxide has an effect to accelerate a reaction of ultraviolet ray curable resin and metal alkoxide, it can improve physical properties of coated film even with a small amount of addition.

Titanium alkoxide includes such as tetramethoxy titanium, tetraethoxy titanium, tetra-iso-propoxy titanium, tetra-n-propoxy titanium, tetra-n-butoxy titanium, tetra-sec-butoxy titanium and tetra-tert-butoxy titanium.

Zirconium alkoxide includes such as tetramethoxy zirconium, tetraethoxy zirconium, tetra-iso-propoxy zirconium, tetra-n-propoxy zirconium, tetra-n-butoxy zirconium, tetra-sec-butoxy zirconium and tetra-tert-butoxy zirconium.

A preferable chelating agent, which forms a chelate compound by coordination to a free metal compound, includes alkanolamines such as diethanolamine and triethanolamine; glycols such as ethylene glycol, diethylene glycol and propylene glycol; acetyl acetone and ethyl acetoacetate, which have a molecular weight of not more than 10,000. By employing these chelating agents, prepared can be a chelate compound which is stable even against mixing of water as well as excellent in a reinforcing effect of coated film.

An addition amount of a metal compound is preferably adjusted so as to make the content of a metal oxide derived from the metal compound in a high refractive index layer of 0.3-5 weight %. Anti-abrasion resistance is insufficient when the content is less than 0.3 weight %, while light fastness is tends to be deteriorated when the content exceeds 5 weight %.

(Ionization Radiation Curable Resin)

Ionization radiation curable resin is added to improve film forming property and physical properties of metal oxide micro-particles as a binder. As ionization radiation curable resin, utilized can be monomer or oligomer having not less than two functional groups which cause a polymerization reaction directly by irradiation of ionization radiation such as ultraviolet rays and electron rays or indirectly by receiving an action of a photo-polymerization initiator. A functional group includes a group having an unsaturated double bond such as (methacryloyloxy group, an epoxy group and a silanol group. Among them, radical polymerizing monomer or oligomer having not less than two unsaturated double bonds can be preferably utilized. A photo-polymerization initiator may be incorporated in combination. Such ionization radiation curable resin includes such as a poly-functional acrylate compound, and preferable is a compound selected from a group comprising pentaerythritol poly-functional acrylate, dipentaerythritol poly-functional acrylate, pentaerythritol poly-functional methacrylate and dipentaerythritol poly-functional methacrylate. Herein, a poly-functional acrylate compound is a compound having not less than two acryloyloxy groups and/or methacryloyloxy groups in a molecule.

Monomer of poly-functional acrylate compound preferably includes such as ethylene glycol diacrylate, diethylene glycol diacrylate, 1,6-hexanediol diacrylate, neopentyl glycol diacrylate, trimethylolpropane triacrylate, trimethylolethane triacrylate, tetramethylolmethane triacrylate, tetramethylolmethane tetraacrylate, pentaglycelol triacrylate, pentaerythritol diacrylate, pentaerythritol triacrylate, pentaerythritol tetraacrylate, glycerin triacrylate, dipentaerythritol triacrylate, dipentaerythritol tetraacrylate, dipentaerythritol pentaacrylate, dipentaerythritol hexaacrylate, tris (acryloyloxyethyl)isocyanulate, ethylene glycol dimethacrylate, diethylene glycol dimethacrylate, 1,6-hexanediol dimethacrylate, neopentyl glycol dimethacrylate, trimethylolpropane trimethacrylate, trimethylolethane trimethacrylate, tetramethylolmethane trimethacrylate, tetramethylolmethane tetramethacrylate, pentaglycelol trimethacrylate, pentaerythritol dimethacrylate, pentaerythritol trimethacrylate, pentaerythritol tetramethacrylate, glycerin trimethacrylate, dipentaerythritol trimethacrylate, dipentaerythritol tetramethacrylate, dipentaerythritol pentamethacrylate and dipentaerythritol hexamethacrylate. These compounds each are utilized alone or in combination of not less than two types. Further, oligomer of such as dimmer or trimer of the aforesaid monomer may be also utilized.

An addition amount of ionization radiation curable resin is preferably not less than 15 weigh % and less, than 50 weight % in a solid content of a high refractive index composition.

To accelerate curing of ionization radiation curable resin according to this invention, a photo-polymerization initiator and an acryl type compound having at least two unsaturated bonds capable of polymerization in a molecule are preferably contained at a weight ratio of 3/7-1/9.

A photo-polymerization initiator specifically includes such as acetophenone, benzophenone, hydroxybenzophenone, Michiler's ketone, α-amyloxime ester and thioxantone; and derivatives thereof, however, is not limited thereto.

(Solvent)

An organic solvent utilized at the time of coating a high refractive index layer of this invention includes alcohols (such as methanol, ethanol, propane, isopropanol, butanol, isobutanol, secondary butanol, tertiary butanol, pentanol, hexanol, cyclohexanol and benzyl alcohol), polyhydric alcohols (such as ethylene glycol, diethylene glycol, triethylene glycol, polyethylene glycol, propylene glycol, dipropylene glycol, butylenes glycol, hexanediol, pentanediol, glycerin, hexanetirol and thioglycol); polyhydric alcohol ethers (such as ethylene glycol monomethyl ether, ethylene glycol monoethyl ether, ethylene glycol monobutyl ether, diethylene glycol monomethyl ether, propylene glycol, dipropylene glycol, butylenes glycol, hexanediol, pentanediol, glycerin, hexanetirol and thioglycol); polyhydric alcohols (such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, ethylene glycol monophenyl ether and propylene glycol monophenyl ether), amines (such as ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine and tetramethylpropylenediamine), amides (such as formamide, N,N-dimethylformamide and N,N-dimethylacetoamide), hetrocycles (such as 2-pyrrolidone, N-methyl-2-pyrroridone, cyclohexyl pyrrolidone, 2-oxazolidone, 1,3-dimethyl-2-imidazolidinone), sulfoxides (such as dimethylsulfoxide), sulfones (such as sulforane), urea, acetonitrile and acetone, however, specifically preferable are alcohols, polyhydric alcohols and polyhydric alcohol ethers.

A medium refractive index layer can be prepared by adjusting such as a content of metal oxide micro-particles against the above-described high refractive index layer.

(Low Refractive Index Layer)

A refractive index of a low refractive index layer utilized in this invention is not higher than a refractive index of transparent resin film as a support and is preferably in a range of 1.30-1.45 based on a measurement at 23° C. and a wavelength of 550 nm.

A layer thickness of a low refractive index layer is preferably 5 nm 0.5 μm, more preferably 10 nm-0.3 μm and most preferably 30 nm-0.2 μm.

A low refractive index layer forming composition utilized in this invention preferably contains an organosilicon compound represented by following formula (3), a hydrolyzate thereof or a polycondensate thereof and hollow silica type micro-particles which have an outer shell and the interior of which is porous or hollow.

　　　　　　　　　　　　　　　　　　　Formula (3)

(wherein, R is an alkyl group.)

In addition to these, such as a silane coupling agent, a curing agent (such as acid or metal chelate) and a surfactant may be appropriately incorporated.

(Hollow Silica Type Micro-Particles)

The aforesaid hollow silica type micro-particles, which have an outer shell and the interior of which is porous or hollow, will now be explained.

Hollow silica type micro-particles are (I) complex particles comprising porous particles with a cover layer arranged on the surface of the porous particles, or (II) hollow particles having hollows inside thereof and the content is filled with a solvent, a gas or a porous substance. Herein, a low refractive index layer may contain either of (I) complex particles or (II) hollow particles, or may contain the both.

Herein, hollow particles are particles having hollows, which are surrounded by a particle wall, in the interior. The hollows are filled with content such as a solvent, a gas or a porous substance which has been utilized in preparation. A mean particle size of such hollow micro-particles is in a range of 5-300 nm and preferably of 10-200 nm. A mean particle size of hollow micro-particles is appropriately selected depending on a thickness of a formed transparent cover layer and is preferably in a range of 2/3-1/10 of a layer thickness of the formed transparent cover layer such as a low refractive index layer. These hollow micro-particles are preferably utilized in a state of being dispersed in a suitable solvent to form a low refractive index layer. A dispersion medium preferably includes water, alcohol (such as methanol, ethanol and isopropyl alcohol), ketone (such as methyl ethyl ketone and methyl isobutyl ketone) and ketone alcohol (such as diacetone alcohol).

A thickness of a cover layer of complex particles or a thickness of a particle wall of hollow particles is preferably in a range of 1-20 nm and more preferably of 2-15 nm. In the case of complex particles, particles may not be completely covered when the cover layer is less then 1 nm, and silicate monomer or oligomer having a low polymerization degree, which is a coating solution component described later, may easily invade into the interior of complex particles resulting in an insufficient effect of a low refractive index. Further, when a thickness of a cover layer is over 20 nm, the aforesaid silicate monomer or oligomer never invade into the interior, however, porosity (micro-pore volume) of complex particles may be decreased resulting in an insufficient effect of a low refractive index. Further, in the case of hollow particles, the particle shape may not be maintained when a thickness of a particle wall is less than 1 nm, while an effect of a low refractive index may not be exhibited when the thickness is over 20 nm.

A cover layer of complex particles or a particle wall of hollow particles preferably employs silica as a primary component. It may contain a component other than silica, which specifically includes $Al_2O_3$, $B_2O_3$, $TiO_2$, $ZrO_2$, $SnO_2$, $CeO_2$, $P_2O_3$, $Sb_2O_3$, $MoO_3$, $ZnO_2$ and $WO_3$. Porous particles to constitute complex particles include those comprising silica, those comprising silica and an inorganic compound other than silica, and those comprising such as $CaF_2$, $NaF$, $NaAlF_6$ and $MgF$. Among them, porous particles comprising silica and complex oxide of silica with an inorganic compound other than silica are specifically preferable. An inorganic compound other than silica includes one type or not less than two types of such as $Al_2O_3$, $B_2O_3$, $TiO_2$, $ZrO_2$, $SnO_2$, $CeO_2$, $P_2O_3$, $Sb_2O_3$, $MoO_3$, $ZnO_2$ and $WO_3$. In such porous particles, mole ratio $MOx/SiO_2$ is in a range of 0.0001-1.0 and preferably of 0.001-03, when silica is $SiO_2$ and an organic compound other than silica is oxide conversion ($Mo_x$). It is difficult to prepare porous particles having mole ratio $MOx/SiO_2$ of less than 0.0001; even when such porous particles can be prepared, micro-pore volume is small not to be able to prepare particles having a low refractive index. Further, since a ratio of silica becomes small when mole ratio $MOx/SiO_2$ is over 1.0, micro-pore volume becomes large possibly to make it further difficult to prepare those having a low refractive index.

A micro pore volume of such porous particles is in a range of 0.1-1.5 ml/g and preferably of 0.2-1.5 ml/g. Particles having a sufficiently low refractive index cannot be prepared when the micro pore volume is less than 0.1 ml/g, while strength of micro-particles may be decreased to lower strength of prepared film when the micro pore volume exceeds 1.5 ml/g.

Herein, a micro pore volume of such porous particles can be determined by a mercury pressure injection method. Further, a content of hollow particles includes such as a solvent, a gas and a porous substance, which are utilized in preparation of the particles. In a solvent, contained may be a non-reacted substance of a particle precursor utilized at the time of preparation of hollow particles and a catalyst utilized. Further, a porous substance includes those comprising compounds listed in the aforesaid porous particles. These contents may be comprised of a single component or may be a mixture of plural components.

As a manufacturing method of such hollow micro-particles, for example, a preparation method of complex oxide colloidal particles disclosed in paragraph Nos. [0010]-[0033] of JP-A 7-133105 can be preferably employed. Specifically, in the case of complex particles comprising silica and an inorganic compound other than silica, hollow micro-particles are prepared according to the following first-third processes.

First Process: Preparation of Precursor of Porous Particles

In the first process, alkaline aqueous solutions of a silica raw material and an inorganic compound other than silica were separately prepared, or a mixed aqueous solution of a silica raw material and an inorganic compound other than silica was prepared, in advance, and this aqueous solution, corresponding to complex ratio of the aimed complex oxide, was gradually added with stirring into an alkaline aqueous solution having a pH of not lower than 10, whereby a precursor of porous particles is prepared.

As a silica raw material, silicate of alkali metal, ammonium or organic base is utilized. As silicate of alkali metal, sodium silicate (water glass) and potassium silicate are utilized. Organic base includes quaternary ammonium salt such as tetraethylammonium salt; and amines such as monoethanolamine, diethanolamine and triethanolamine. Herein, silicate of ammonium or silicate of organic base also includes an alkaline solution added with such as ammonia, quaternary ammonium hydroxide and an amine compound.

Further, as a raw material of an inorganic compound other than silica, an alkaline soluble inorganic compound is utilized. Specifically, preferable are oxo acid of an element selected from such as Al, B, Ti, Zr, Sn, Ce, P, Sb, Mo, Zn and W; alkali metal salt or alkaline earth metal salt of the oxo acid; ammonium salt and quaternary ammonium salt. More specifically, suitable are sodium aluminate, sodium tetraborate, zirconyl ammonium carbonate, potassium antimonite, potassium stannate, sodium aluminosilicate, sodium molybdate, cerium ammonium nitrate and sodium phosphate.

A pH value of a mixed solution is changed simultaneously with addition of these aqueous solutions; however, an operation to control this pH value in a predetermined range is not necessary. The aqueous solution finally becomes a pH value determined by a type of inorganic substance and a mixing ratio thereof. At this time, there is no specific limitation of an addition rate of an aqueous solution. Further, at the time of manufacturing of complex oxide particles, it is possible to utilize a dispersion of seed particles as a starting material. As the seed particles, there is no specific limitation, however, micro-particles of inorganic oxide of such as $SiO_2$, $Al_2O_3$, $TiO_2$ and $ZrO_2$ and complex oxide thereof are utilized, and generally sol thereof can be utilized. Further, a precursor dispersion of porous particles prepared by the aforesaid manufacturing method may be utilized as a seed particle dispersion. In the case of utilizing a seed particle dispersion, an aqueous solution of the aforesaid compound is added with stirring into the seed particle dispersion after pH of which has been adjusted to not lower than 10. Also in this case, it is not necessarily to conduct pH control of a dispersion. By utilizing seed particles in this manner, it is easy to control a particle size of porous micro-particles prepared and particles having a narrow particle size distribution can be prepared.

Silica raw material and inorganic compound raw material described above have high solubility at the alkaline side. However, when the both are utilized in this pH region of large solubility, solubility of an oxo acid ion such as silicate ion and aluminate Ion is decreased to induce precipitation of a complex substance thereof to form micro-particles or precipitation of the complex on seed particles resulting in particle growth. Therefore, at the time of precipitation of micro-particles and growth, it is not necessary to perform pH control as in a conventional method.

A complex ratio of silica and an inorganic compound other than silica in the first process is preferably in a range of 0.05-2.0 and more preferably in a range of 0.2-2.0, based on a mol ratio of $MO_x/SiO_2$ when an inorganic compound is converted to oxide ($MO_x$). In this range, the smaller is silica ratio, increased is a micro-pore volume of porous particles. However, even when the mol ratio exceeds 2.0, the micro-pore volume of porous particles hardly increases, On the other hand, in the case of preparing hollow particles, a ratio of $MO_x/SiO_2$ is preferably in a range of 0.25-2.0.

Second Process: Elimination of Inorganic Compound Other than Silica from Porous Particles In the second process, at least part of an inorganic compound other than silica (elements other than silica and oxygen) are eliminated from porous particle precursor prepared in the aforesaid first process. As a specific elimination method, an inorganic compound in a porous particle precursor is dissolved to be eliminated utilizing mineral acid or organic acid or is ion exchanged to be eliminated by being brought in contact with cation-exchange resin.

Herein, a porous particle precursor is a particle having a network structure in which silica and an element constituting an inorganic compound bond via oxygen. By eliminating an inorganic compound (elements other than silica and oxygen) from a porous particle precursor in this manner, porous particles having further porosity and a larger micro-pore volume can be prepared. Further, the amount of an inorganic compound (elements other than silica and oxygen) eliminated from porous particle precursor is increased, hollow particles can be prepared.

Further, before eliminating an inorganic compound other than silica from porous particle precursor, it is preferable to form a silica protective layer by addition of silicate solution containing a fluorine substituted group containing silane compound or hydrolyzing organic silicon compound, which are prepared by dealkalization of alkali metal salt of silica. A thickness of the silica protective layer is preferably 0.5-15 nm. Herein, since a protective layer is porous and has a thin layer thickness even a silica protective layer has been formed; it is possible to eliminate the aforesaid inorganic compound other than silica from a porous particle precursor.

By forming such a silica protective layer, it is possible to eliminate an inorganic compound other than silica from a porous particle precursor while keeping the particle shape. Further, at the time of forming a silica cover layer which will be described later, micro-pore of porous particles never be filled up with the cover layer, whereby formation of silica cover layer is possible without decreasing a micro pore volume. Herein, since a particle is never broken when the amount of an inorganic compound to be eliminated is small, it is not necessary to form a protective layer.

Further, in the case of forming hollow particles, it is desirable to form this silica protective film. In the case of preparing hollow particles, prepared can be a precursor of a hollow particle comprising a solvent in the silica protective film and insoluble porous solid when an inorganic compound is eliminated, and when a cover layer is formed on the precursor of hollow particles, the cover layer formed will make a particle wall, whereby hollow particles are prepared.

An amount of silica source added to form the above-described silica protective film is preferably the smaller within a range capable of maintaining the particle shape. When an amount of silica source is excessive, silica protective film becomes excessively thick to possibly make elimination of an inorganic compound other than silica from a porous particle precursor difficult. As a hydrolysable organic silicon compound utilized for silica protective film formation, alkoxy silane represented by formula $R_nSi(OR')_{4-n}$ [R, R': a hydrocarbon group such as an alkyl group, an aryl group, a vinyl group, an acryl group; n=0, 1, 2 or 3] can be utilized. Particularly, alkoxysilane such as tetramethoxysilane, tetraethoxysilane and tetrapropoxysilane which are substituted by fluorine is preferably utilized.

As an addition method, a solution comprising a mixed solution of these alkoxysilane, pure water and alcohol is added with a small amount of alkali or acid as a catalyst is added into the aforesaid dispersion of porous particles, and silicate polymer generated by hydrolysis of alkoxysilane is precipitated on the surface of inorganic oxide particles. At this time, alkoxysilane, alcohol and a catalyst may be simultaneously added into a dispersion. As an alkaline catalyst, ammonia, hydroxide of alkali metal and amines can be utilized. Further, as an acid catalyst, various types of inorganic acid and organic acid can be utilized.

In the case that a dispersion medium of a porous particle precursor is water alone or the ratio of water against an organic solvent is high, it is also possible to form silica protective film by use of a silicate solution. In the case of utilizing a silicate solution, a predetermined amount of a silicate solution is added into a dispersion and alkali is simultaneously added to make silicate solution precipitate on the porous particle surface. Herein, silica protective film may be formed by use of silicate solution and the above-described alkoxysilane together.

Third Process: Formation of Silica Cover Layer

In the third process, the surface of particles are covered with polymer such as a hydrolyzing organic silicon compound or a silicate solution to form a silica cover layer, by addition a hydrolyzing organic silicon compound or a silicate solution which contains a fluorine substituted alkyl group containing silane compound to a porous particle dispersion (a hollow particle precursor dispersion in the case of hollow particles) prepared in the second process.

As a hydrolysable organosilicon compound utilized for silica cover layer formation, alkoxysilane represented by formula $R_nSi(OR')_{4-n}$ [R, R': a hydrocarbon group such as an alkyl group, an aryl group, a vinyl group, an acryl group; n=0, 1, 2 or 3] as described above can be utilized. Particularly, alkoxysilane such as tetramethoxysilane, tetraethoxysilane and tetrapropoxysilane which are substituted by fluorine is preferably utilized.

As an addition method, a solution comprising a mixed solution of these alkoxysilane, pure water and alcohol is added with a small amount of alkali or acid as a catalyst is added into the aforesaid dispersion of porous particles, and silicate polymer generated by hydrolyzed of alkoxysilane is precipitated on the surface of porous particles (a hollow particle precursor in the case of hollow particles). At this time, alkoxysilane, alcohol and a catalyst may be simultaneously added into a dispersion. As an alkaline catalyst, ammonia, hydroxide of alkali metal and amines can be utilized. Further, as an acid catalyst, various types of inorganic acid and organic acid can be utilized.

In the case that a disperse medium of porous particles (a hollow particle precursor in the case of hollow particles) is water alone or a mixed solvent with an organic solvent, wherein the ratio of water against an organic solvent is high, it is also possible to form a cover layer by use of a silicate solution. A silicate solution is an aqueous solution of low molecular weight polymer of silicic acid which is prepared by dealkalization of an aqueous solution of alkali metal silicate such as water glass via an ion exchange treatment.

A silicic acid solution is added into a dispersion of porous particles (a hollow particle precursor in the case of hollow particles) and alkali is simultaneously added to precipitate silicate polymer on the surface of porous particles (a hollow particle precursor in the case of hollow particles). Herein, a silicic acid solution may be utilized together with the above-described alkoxysilane for cover layer formation. An addition amount of an organosilicon compound or a silicic acid solution, utilized for cover layer formation is as much as to sufficiently cover the surface of colloidal particles, and finally the amount so as to make thickness of a silica cover layer of 1-20 nm is added into a dispersion of porous particles (a hollow particle precursor in the case of hollow particles). Further, in the case that the aforesaid silica protective film is formed, an organosilicon compound or a silicic acid solution is added at an amount to make the total thickness of silica protective film and a silica cover layer of 1-20 nm.

Next, a dispersion of particles having been provided with a cover layer is subjected to a heat treatment. By a heat treatment, a silica cover layer covering the surface of porous particles become minute, whereby a dispersion of complex particles comprising porous particles covered with a silica cover layer is prepared. Further, in the case of hollow particles, a formed cover layer becomes minute to be a hollow particle wall, whereby a dispersion of hollow particles having hollows, the interior of which is filled with a solvent, a gas or a porous solid, is prepared.

The temperature of at this heat treatment is not specifically limited provided being a degree to block micro-pores of a silica cover layer and is preferably in a range of 80-300° C. Micro-pores of a silica cover layer may not be completely blocked to become minute or long time may be required for the treatment when the heating temperature is lower than 80° C. while particles become minute resulting in losing an effect of low refractive index when a long time treatment at a heating temperature of over 300° C. is applied.

A refractive index of inorganic micro-particles thus prepared is as low as lower than 1.42. Such inorganic micro-particles are estimated to have a low refractive index because porosity of the interior of porous particles is maintained or the interior is hollow.

The content of hollow silica type micro-particles, which have an outer layer and the interior of which is porous or hollow, in a low refractive index layer is preferably 10-50 weight %. It is preferably not less than 15 weight % with respect to obtain an effect of low refractive index, however, a binder component becomes small to make layer strength insufficient when it exceeds 50 weight %. Specifically preferable is 20-50 weight %.

(Organosilicon Compound Represented by Formula (3), Hydrolizate or Polycondensate Thereof)

In the aforesaid organosilicon compound represented by formula (3), R is an alkyl group and preferably an alkyl group having a carbon number of 1-4.

Specifically, tetraalkyl silane such as tetramethoxysilane, tetraethoxysilane and tetrapropoxysilane is preferably utilized.

As an addition method to a low refractive index layer, a solution comprising a mixed solution of these alkoxysilane, pure water and alcohol, being added with a small amount of alkali or acid as a catalyst, is added into the aforesaid dispersion of hollow micro-particles, and silicate polymer generated by hydrolysis of alkoxysilane is precipitated on the surface of hollow micro-particles. At this time, alkoxysilane, alcohol and a catalyst may be simultaneously added into a dispersion. As an alkaline catalyst, ammonia, hydroxide of alkali metal and amines can be utilized. Further, as an acid catalyst, various types of inorganic acid and organic acid can be utilized.

Metal chelate includes alkoxide or chelate compounds of such as aluminum, titanium and zirconium. These metal chelate compounds include zirconium chelate compounds such as tri-n-butoxyethylacetoacetate zirconium, di-n-butoxybis (ethylacetoacetate) zirconium, n-butoxytristethylacetoatetate) zirconium, tetrakis(n-propylacetoacetate) zirconium, tetrakis(acetylacetoacetate) zirconium and tetrakis (ethylacetoacetate) zirconium; titanium chelate compounds such as diisopropoxy-bis(ethylacetoacetate) titanium, diisopropoxy-bis(acetylacetate) titanium and diisopropoxy•bis (acetylacetone) titanium; and aluminum chelate compounds such as diisopropoxyethylacetoacetate aluminum, diisopropoxyacetylacetonatoaluminum, isopropoxy-bis(ethylacetoacetate)aluminum, isopropoxy-bis(acetylacetonato)aluminum, tris(ethylacetoacetate)aluminum, tris(acetylactonato)aluminum and monoacetylacetonato•bis (ethylacetoacetate)aluminum. Among these metal chelate compounds, preferable are tri-n-butoxyethylacetoacetate zirconium, diisopropoxy-his(acetylacetonato)titanium, diisopropoxyethylacetoacetate aluminum and tris(ethylacetoactate)aluminum. These metal chelate compounds can be utilized alone or by mixing at least two types. Further, a partial hydrolizate of these metal chelate compounds can be also utilized. A metal chelate compound can be utilized in a ratio of preferably 0.01-40 weight %, more preferably 0.1-30 weight % and further more preferably 0.5-10 weight.

Further, in this invention, a fluorine substituted alkyl group containing silane compound represented by following formula (4) may be also incorporated

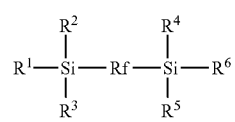

Formula (4)

A fluorine substituted alkyl group containing silane compound represented by aforesaid formula (4) will now be explained.

In the formula, $R^1$-$R^6$ is an alkyl group having a carbon number of 1-16 and preferably of 1-4; a halogenated alkyl group having a carbon number of 1-6 and preferably of 1-4; an aryl group having a carbon number of 6-12 and preferably 6-10; an alkyl aryl group or an aryl alkyl group having a carbon number of 7-14 and preferably 7-12; an alkenyl group having a carbon number of 2-8 and preferably 2-6; an alkoxy group having a carbon number of 1-6 and preferably 11-3; a hydrogen atom or a halogen atom.

Rf is —$(C_aH_bF_c)$—, wherein a is an integer of 1-12, b+c is 2a, and b is an integer of 0-24. Such Rf is preferably a group having a fluoroalkylene group and an alkylene group. Specifically, such a fluorine-containing silicone type compound includes a methoxydisilane compound represented by $(MeO)_3SiC_2H_4C_2F_4C_2H_4Si(MeO)_3$, $(MeO)_2SiC_2F_4C_4F_8C_2H_4Si(MeO)_3$, $(MeO)SiC_2H_4C_6F_{12}C_2H_4Si(MeO)$, $(H_5C_2O)_3SiC_2H_4C_4F_6C_2H_4Si(OC_2H_5)_3$ and $(H_5C_2O)_3SiC_2H_4C_6F_{12}C_2H_4Si(OC_2H_5)_3$.

When a fluorine substituted alkyl group containing silane compound is contained as a binder; since formed transparent cover film itself has hydrophobicity, invasion of a water content and chemicals such as acid and/or alkali is restrained even when transparent cover film is not sufficiently made to be minute and is porous or has cracks and voids. Further, micro-particles, which are contained in the substrate surface or in conductive layer as an under layer, will never react with chemicals such as acid and/or alkali. Therefore, such transparent cover film has excellent chemical resistance.

Further, when a fluorine substituted alkyl group containing silane compound is contained as a binder, sliding property is excellent (contact resistance is low) in addition to such hydrophobicity, whereby transparent cover film having superior scratch resistance can be prepared. Further, when a binder contains a fluorine substituted alkyl group containing silane compound having such a constituent unit, in the case of a conductive layer is arranged as an under layer, transparent cover film exhibiting excellent adhesion with a conductive layer can be prepared because shrinking rate of a binder is equal to or near to that of a conductive layer. Further, at the time of heat treatment of transparent cover film, there is no chance to generate a part without electrical contact in a transparent conductive layer because of peeling off of a conductive layer due to difference in shrinking rate. Therefore, a sufficient conductive property can be maintained as a whole film.

Transparent cover film which is provided with a fluorine substituted alkyl group containing silane compound and the aforesaid outer shell layer and contains hollow silica type micro-particles the interior of which is porous or hollow, has a large scratch resistance, large film strength evaluated by eraser strength or nail strength and large pencil strength, to enable preparation of transparent cover film being excellent with respect to strength.

A silane coupling agent may be contained in a low refractive index layer utilized in this invention. A silane coupling agent includes methyltrimethoxysilane, methyltriethoxysilane, methyltrimethoxyethoxysilane, methyltriacetoxysilane, methyltributoxysilane, ethyltrimethoxysilane, ethyltriacetoxysilane, vinyltrimethoxysilane, vinyltriethoxysilane, vinyltriacetoxysilane, phenyltrimethoxysilane, phenyltriethoxysilane, phenyltriacetoxysilane, γ-chlolopropyltrimethoxysilnae, γ-chlolopropyltriethoxysilnae, γ-chlolopropyltriacetoxysilnae, 3,3,3-trifluoropropyltrimethoxysilane, γ-glycidyloxypropyltrimethoxysilane, γ-glycidyloxypropyltriethoxysilane, γ-(β-glycidyloxyethoxy)propyltrimethoxysilane, β-(3,4-epoxycyclohexyl)ethyltrimethoxysilane, β-(3,4-epoxycyclohexyl)ethyltriethoxysilane, γ-acryloyloxypropyltrimethoxysilnae, γ-methacryloyloxypropyltrimethoxysilnae, γ-aminopropyltrimethoxysilane, γ-aminopropyltriethoxysilane, γ-mercaptopropyltrimethoxysilane, γ-mercaptopropyltriethoxysilane, N-β-(aminoethyl)-γ-aminopropyltrimethoxysilane and β-cyanoethyltriethoxysilane.

Further, examples of a silane coupling agent having an alkyl group which is substituted at 2-position against silicon include dimethylmethoxysilane, phenylmethyldimethoxysilane, dimethyldiethoxysilane, phenylmethyldiethoxysilane, γ-glycidyloxypropylmethyldimethoxysilane, γ-glycidyloxypropylmethyldiethoxysilane, γ-glycidyloxypropylphenyldiethoxysilane, γ-chloropropylmethyldiethoxysilane, dimethyldiacetoxysilane, γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, γ-mercaptopropylmethyldimethoxysilane, γ-mercaptopropylmethyldiethoxysilane, γ-aminopropylmethyldimethoxysilane, γ-aminopropylmethyldiethoxysilane, methylvinyldimethoxysilane and methylvinyldiethoxysilane.

Among them, vinyltrimethoxysilane, vinyltriethoxysilane, vinyltriacetoxysilane, vinyltrimethoxyethoxysilane, γ-acryloyloxypropyltrimethoxysilane and γ-methacryloyloxypropyltrimethoxysilane; and γ-acryloyloxypropylmethyldimethoxysilane, γ-acryloyloxypropyltrimethyldiethoxysilane, γ-methacryloyloxypropylmethyldimethoxysilane, γ-methacryloyloxypropylmethyldiethoxysilane, methylvinyldimethoxysilane and methylvinyldiethoxysilane as those having an alkyl group which is substituted at 2-position against silicon are preferable; and γ-acryloyloxypropyltrimethoxysilane and γ-methacryloyloxypropyltrimethoxysilane, γ-acryloyloxypropylmethyldimethoxysilane, γ-acryloyloxypropylmethyldiethoxysilane, γ-methacryloyloxypropylmethyldimethoxysilane and γ-methacryloyloxypropylmethyldiethoxysilane are specifically preferable.

Not less than two types of coupling agents may be utilized in combination. In addition to silane coupling agents described above, other silane coupling agents may be utilized. Other silane coupling agents include alkyl ester of ortho silicic acid (such as methyl orthosilicate, ethyl orthosilicate, n-propyl orthosilicate, i-propyl orthosilicate, n-butyl orthosilicate, sec-butyl orthosilicate and t-butyl orthosilicate) and hydrolizate thereof.

Polymer utilized as other binder of a low refractive index layer includes such as polyvinyl alcohol, polyoxyethylene, polymethyl methacrylate, polymethyl acrylate, diacetyl cellulose, triacetyl cellulose, nitro cellulose, polyester and alkyd resin.

A low refractive index layer preferably contains 5-80 weight % of a binder as a total. A binder makes hollow silica micro-particles adhere and has a function of maintaining a structure of a low refractive index layer containing hollows A using amount of a binder is adjusted so as to maintain strength of a low refractive index layer without filling hollows.

[Solvent]

A low refractive index layer of this invention preferably contains an organic solvent. Specific examples of a solvent include alcohol (such as methanol, ethanol, isopropanol, butanol and benzyl alcohol), ketone (such as acetone, methyl ethyl ketone, methyl isobutyl ketone and cyclohexanone), ester (such as methyl acetate, ethyl acetate, propyl acetate, butyl acetate, methyl formate, ethyl formate, propyl formate and butyl formate), aliphatic hydrocarbon (such as hexane and cyclohexane), aromatic hydrocarbon (such as benzene, toluene and xylene), amide (such as dimethylformamide, dimethylacetoamide and N-methylpyrrolidone), ether (such as diethyl ether, dioxane and tetrahydrofuran) and ether alcohol (such as 1-methoxy-2-propanol). Among them, toluene, xylene, methyl ethyl ether, methyl isobutyl ketone, cyclohexanone and methanol are specifically preferable.

A solid content in a low refractive index layer coating composition is preferably 1-4 weight %, and coating unevenness is barely caused by setting the solid content of not more than 4 weight % while drying load is reduced by setting a solid content of not less than 1 weight.

(Fluorine Type Surfactant, Silicone Oil or Silicone Surfactant)

In this invention, a fluorine type surfactant, silicone oil or a silicone surfactant can be incorporated in the aforesaid high refractive index layer and a low refractive index layer. By incorporation of the above-described surfactant, it is effective to reduce coating unevenness and to improve an anti-stain capability of the film surface.

A fluorine type surfactant is those comprising monomer, oligomer or polymer containing a perfluoroalkyl group as a mother nucleus and includes derivatives of such as polyoxyethylene alkyl ether, polyoxyethylene alkyl allyl ether and poloxyethylene.

Fluorine type surfactants available on the market can be also utilized and include such as Surflone "S-381", "S-382", "SC-101", "SC-102"/"SC-103" and "SC-104" (manufactured by Asahi Glass Co., Ltd.); Fulorad "FC-430", "FC-431" and "FC-173" (manufactured by Jemco Inc.); Schwego Fluor "8035" and "8036" (manufactured by Bernd Schwegmann GmbH & Co. KG.); "BM-100" and "BM-1100" (manufactured by B. M. Chemie Co., Ltd.); and Megafac "F-171" and "F-470" (manufactured by Dainippon Ink & Chemicals, Inc.).

A ratio of a fluorine type surfactant content in this invention is 0.05-2% and preferably 0.1-1%. The above-described fluorine type surfactant may be utilized alone or may be utilized in combination of not less than two types, and may be utilized in combination with other surfactant.

Silicone oil or a silicone surfactant will now be explained.

Silicone oil utilized in this invention is roughly classified into straight silicone oil and modified silicone oil depending on the type of an organic group bonding to a silicon atom. Straight silicon oil is one in which a silicon atom bonds with a methyl group, a phenyl group or a hydrogen atom as a substituent, Modified silicone oil is those having a constituent portion secondarily derived from straight silicone oil. On the other hand, silicone oil can be classified according to the reactivity. These will be summarized as follows.

Silicone Oil

1. Straight Silicone Oil 1-1. Non-reactive silicone oil: such as dimethyl, methyl substituted 1-2. Reactive silicone oil: such as methyl, hydrogen substituted.

2. Modified Silicone Oil

Modified silicone oil is generated by introducing various organic groups into dimethylsilicone oil 2-1. Non-reactive silicone oil: such as alkyl, alkyl/aralkyl, alkyl/polyether, polyether and higher fatty acid ester substituted;

Alkyl/aralkyl modified silicone oil is silicone oil in which a part of methyl groups of dimethylsilicone oil is substituted by a long chain alkyl group or a phenylalkyl group;

Polyether modified silicone oil is a silicone type polymer surfactant in which hydrophilic polyoxyalkylene is introduced in hydrophobic dimethylsilicone;

Higher fatty acid modified silicone oil is silicone oil in which a part of methyl groups of dimethylsilicone oil is substituted by higher fatty acid ester;

Amino modified silicone oil is silicone oil having a structure in which a part of methyl groups of silicone oil is substituted by an aminoalkyl group;

Epoxy modified silicone oil is silicone oil having a structure in which a part of methyl groups of silicone oil is substituted by an epoxy group containing alkyl group;

Carboxyl modified or alcohol modified silicone oil is silicone oil having a structure in which a part of methyl groups of silicone oil is substituted by a carboxyl group or hydroxyl group containing alkyl group.

2-2. Reactive silicone oil: such as amino, epoxy, carboxyl and alcohol substituted, Among them, polyether modified silicone oil is preferably incorporated. A number average molecular weight of polyether modified silicone oil is, for example, 1,000-100,000 and preferably 2,000-50,000; drying ability of coated film is decreased when the number average molecular weight is less than 1,000, while bleed out is hardly caused on the coated film surface when the number average molecular weight is over 100,000.

Specific commercial products include such as L-45, L-9300, FZ-3704, FZ-3703, FZ-3720, FZ-3786, FZ-3501, FZ-3504, FZ-3508, FZ-3705, FZ-3707, FZ-3710, FZ-3750, FZ-3760, FZ-3785, FZ-3785 and Y-7499, manufactured by Nippon Unicar Co., Ltd; KF96L, KF96, KF96H, KF99, KF54, KF965, KF968, KF56, KF995, KF351, KF352, KF353, KF354, KF355, KF615, KF618, KF945, KF6004 and FL100 manufactured by Shin-Etsu Chemical Co., Ltd.

Next, a silicone surfactant utilized in this invention is a surfactant in which a part of methyl groups of silicone oil is substituted by a hydrophilic group. A substitution position is such as a side chain, the both ends, one end, the both terminal side chains. A hydrophilic group includes such as polyether, polyglycerin, pyrrolidone, betaine, sulfate, phosphate and quaternary salt.

Among them, preferable is a nonionic surfactant comprising dimethylsiloxane as a hydrophobic group and polyoxyalkylene as a hydrophilic group.

A nonionic surfactant generally refers to a surfactant having no group to dissociate into an ion in an aqueous solution, and is provided with such as a hydroxyl group of polyhydric alcohols as a hydrophilic group or polyoxyalkylene chain (polyoxyethylene), in addition to a hydrophobic group. Hydrophilicity becomes strong as the number of alcoholic hydroxyl groups becomes large or the length of a polyoxyalkylene chain becomes long. A nonionic surfactant according to this invention is characterized by having dimethylsiloxane as a hydrophobic group.

Further, by utilizing a nonionic surfactant comprising dimethylsiloxane as a hydrophobic group and polyalkylene as a hydrophilic group, unevenness and anti-staining property of the film surface of the aforesaid low refractive index layer will be improved. It is considered that a hydrophobic group comprising polymethylsiloxane is aligned on the surface to form a film surface being hardly stained. This effect cannot be achieved by utilizing other surfactants.

Specific examples of these nonionic surfactants include such as silicone surfactants SILWET L-77, L-720, L-7001, L-7002, L-7604, Y-7006, FZ-2101, FZ-2104, FZ-2105, FZ-2110, FZ-2118, FZ-2120, FZ-2122, FZ-2123, FZ-2130, FZ-2154, FZ-2161, FZ-2162, FZ-2163, FZ-2164, FZ-2166 and FZ-2191, manufactured by Nippon Unicar Co., Ltd.

Further, listed are SUPERSILWET SS-2801, S5-2802, SS-2803, SS-2804 and SS-2805.

Further, a preferable structure of these nonionic surfactant comprising dimethylsiloxane as a hydrophobic group and polyoxyalkylene as a hydrophilic group is straight chain block copolymer in which a dimethylsiloxane structure portion and a polyoxyethylene chain are alternately and repeatedly-bond. This copolymer is excellent because of a long chain of the main chain skeleton and the straight chain structure. This is considered because one surfactant can adsorbs on the surface of a silica micro-particle so that the particle is cover at plural portions, because the copolymer is comprised of an alternately repeating hydrophilic group and hydrophobic group.

Specific examples thereof include silicone surfactants ABN SILWET FZ-2203, FZ-2207 and FZ-2208, manufactured by Nippon Unicar Co., Ltd.

Among these silicone oil or silicone oil surfactants, those having a polyether group are preferable.

Other surfactants may be utilized together; anionic surfactants such as a sulfonate acid type, a sulfate ester type and a phosphate aster type; and nonionic surfactants such as an ether type and an ether ester type, which are provided with polyoxyethylene as a hydrophilic group, may be utilized together.

In this invention, a content of these silicone oil or silicone surfactants in a high refractive index layer and a low refractive index layer is preferably 6.05-2.0 weight %.

(Formation of Antireflection Layer)

In this invention, a preparation method of an antireflection layer is not specifically limited, however, it is preferably formed by coating. Each layer of an antireflection layer is formed on a hard coat layer by coating by means of a dip coating method, an air knife coating method, a curtain coating method, a roller coating method, a wire bar coating method, a gravure coating method and an extrusion coating method.

Particularly, it is preferable to form the aforesaid hard coat layer on one surface of transparent resin film with coating and the resulting film, after having been wound up in a roll form, is unwound again to coat the aforesaid antireflection layer on the hard coat layer. It is also possible to continuously coat a hard coat layer and an antireflection layer, however, an effect of restraining defects at the time of coating of an antireflection layer can be expected due to sufficient annealing of the hard coat layer surface by once winding up the film in a roll form.

Further, the hard coat surface is also preferably subjected to a surface treatment before coating of an antireflection layer. The surface treatment includes such as a washing method, an alkaline processing method, a flame plasma processing method, a high frequency discharge plasma method, an electron beam method, an ion beam method, a spattering method, an acid processing method and a corona processing method; and specifically preferable is an alkali processing method.

Further, an antireflection film of this invention is preferably subjected to a heat treatment after the aforesaid high refractive index layer and a low refractive index layer have been coated. A specific heat treatment is not particularly limited, however, the film is preferably manufactured by a manufacturing method in which, after the aforesaid antireflection layer has been coated on transparent film, the resulting film in a state of being wound in a roll form is subjected to a heat treatment in a range of 50-150° C. for 1-30 days.

(Physical Properties of Antireflection Layer)

A refractivity of an antireflection film according to this invention can be measured by use of a spectrometer. At this time, the back side against the measurement side of a sample, after having been subjected to a roughening process, is subjected to a light absorption treatment by use of a black spray, then reflective light in a visible light region (400-700 nm) is measured. It is preferable the lower is reflectance, however, a mean value in wavelengths of a visible light region is preferably not more than 1.5% and the lowest reflectance is preferably not more than 0.8%. It can be considered that an antireflection layer is provided when a mean reflectance at wavelengths in a visible light region is not more than 1.5%. Further, it is preferable to be provided with reflective spectrum of a flat form in a visible wavelength region.

Further, reflection hue of the polarizing plate surface having been subjected to an antireflection treatment is often colored red or blue because a reflectance in a short wavelength region or a long wavelength region becomes high in a visible light region based on design of the antireflection film; however, a demand to color of reflective light differs depending on the application and neutral tone is required in the case of utilizing in the outermost surface of such as a FPD television. In this case, a reflective hue region generally preferred is $0.17 \leq x \leq 0.27$ and $0.07 \leq y \leq 0.17$ on XYZ colorimetric reference system (CIE1931 colorimetric reference system).

A layer thickness of a high refractive index layer and a low refractive index layer is determined by calculation according to a general method from a refractive index of each layer in consideration of a color of reflective light.

(Transparent Resin Film)

Next, transparent resin film utilized in this invention will be explained.

With respect to transparent resin film utilized in this invention, a preferable requirement includes such as easiness of manufacturing, excellent adhesion with a hard coat layer, optical isotropy and optical transparency.

Transparent in this invention refers to transmittance of visible light of not less than 60%, preferably not less than 80% and specifically preferably not less than 90%.

There is not specific limitation provided that having the above-described properties, and listed are cellulose ester type film such as cellulose diacetate film, cellulose triacetate film, cellulose acetate propionate film and cellulose acetate butyrate film; polyester type film; polycarbonate type film; polyallylate type film; polysulfone (including polyether sulfone) type film; polyester type film such as polyethylene terephthalate and polyethylene naphthalate; polyethylene film; polypropylene film; cellophane; polyvinylidene chloride film; polyvinyl alcohol film; ethylene vinyl alcohol film; syndiotactic polystyrene type film; cycloolefin polymer film (Arton (manufactured by JSR Corp.), Zeonex and Zeonoa (manufactured by Zeon Corp.)); Polymethylpentene film; polyetherketone film; polyetherketone imide film; polyamide film; fluorine resin film; nylon film; polymethylmethacrylate film; acryl film; polylactic acid film or a glass plate. Among them preferable are cellulose ester type film, polycarbonate film, polyester film, polysulfone (including polyethersulfone) type film and cycloolefin polymer film; and in this invention, cellulose ester type film (such as Konicaminolta TAC, product names of KC8UX, KC4UX, KC 8UXC, 4KC8Ux, KC5UX, KC8UCF, KC8UCR4, KC8UCR5, KC8UY, KC12UR, KC4FR-1, KC8ue and KC4uE (manufactured by Konicaminolta Opt Co., Ltd.)) is preferably utilized with respect to manufacturing, cost, transparency and adhesion. These films may be film manufactured by melt casting or by solution casting.

In this invention, as transparent film, cellulose ester type film (hereinafter, also referred to as cellulose ester film) is preferably utilized. As cellulose ester, cellulose acetate, cellulose acetate butyrate, cellulose acetate phthalate and cellulose acetate propionate are preferable, and among them cellulose acetate butyrate, cellulose acetate phthalate and cellulose acetate propionate are preferably utilized.

Preferable is an antireflection film comprising a hard coat layer and an antireflection layer being arranged on transparent resin film containing mixed fatty acid ester of cellulose, in which X and Y are specifically in the following region when a substitution degree of an acetyl group is X and a substitution degree of a propionyl group or a butyryl group is Y.

$$2.3 \leq X+Y \leq 3.0$$

$$0.1 \leq Y \leq 1.5$$

Specifically preferable is;

$$2.5 \leq X+Y \leq 2.9$$

$$0.3 \leq y \leq 1.2$$

Cellulose as a starting material of cellulose ester utilized in this invention is not specifically limited and includes such as cotton linter, wood pulp (derived from an acerose and a broard leaved tree) and kenaf. Cellulose ester obtained from them can be utilized by mixing at an arbitrary ratio. These cellulose esters can be prepared, in the case of an acylation agent being acid anhydride (such as acetic acid anhydride, propionic acid anhydride and lactic acid an hydride), by utilizing an organic acid such as acetic acid and an organic solvent such as methylene chloride together with a protonic catalyst such as sulfuric acid and reacting them with a cellulose starting material.

In the case of an acylation agent being acid chloride (such as $CH_3COCl$, $C_2H_5COCl$ and $C_3H_7COCl$), the reaction is conducted by use of a basic compound such as amine as a catalyst. Specifically, the cellulose ester can be synthesized in reference to a method such as described in JP A 10-48804. Further, cellulose ester utilized in this invention is one in which the above-described acylation agent is mixed corresponding to each substitution degree and reacted; in cellulose ester these acylation agents have reacted with hydroxyl groups of a cellulose ester molecule. A cellulose molecule is comprised of those in which many glucose units are connected, and a glucose unit has three hydroxyl groups. The number of acyl groups introduced to these three hydroxyl groups is referred to as a substitution degree (mol %). For example, acetyl groups bond to all three hydroxyl groups in cellulose triacetate (practically, 2.6-3.0). Even when substitution degrees of hydroxyl groups against hydroxyl groups at 2-, 3- and 6-positions may be averaged, or a substitution degree at 6-position may be higher or lower; any one can be preferably utilized.

Cellulose ester utilized in this invention is not specifically limited, however, mixed fatty acid ester of cellulose, in which a propionate group or a butyrate group bonds in addition to an acetyl group, such as cellulose acetate propionate, cellulose acetate butyrate and cellulose acetate propionate butyrate is preferably utilized. Herein, a butyryl group to form butyrate may be either a straight chain form or branched.

Cellulose acetate propionate which contains a propionate group as a substituent is excellent in water resistance and useful as film for a liquid crystal display device.

Measurement of a substitution degree of an acyl group can be conducted based on a definition of ASTM-D817-96.

A number average molecular weight of cellulose ester is preferably 70,000-250,000 with respect to large mechanical strength in the case of being molded and a suitable dope viscosity, and more preferably 80,000-150,000.

The cellulose ester is preferably made into film by a generally called as a solution casting method in which, a solution of cellulose ester (dope) is cast from a pressure die on a casting support such as made of an unlimitedly conveyed endless metal belt or a rotating metal drum.

An organic solvent utilized for preparation of the dope is preferably capable of dissolving cellulose ester and provided with a suitable boiling point, and includes methylene chloride, methyl acetate, ethyl acetate, amyl acetate, methyl acetoacetate, acetone, tetrahydrofuran, 1,3-dioxorane, 1,4-dioxane, cyclohexanone, ethyl formate, 2,2,2-trifluoroethanol, 2,2,3,3-tetrafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, nitroethane and 1,3-dimethyl-2-imidazolidinone, however, an organohalogen compound such as methylene chloride, dioxorane derivatives, methyl acetate, ethyl acetate, acetone and methyl acetoacetate are preferable as an organic solvent (that is a good solvent).

Further, as shown in the following casting process, a boiling point of an organic solvent utilized is preferably 30-80° C. with respect to preventing foaming in a web at the time of evaporating a solvent from a web (dope film) having been formed on a casting support, and boiling points of the above-described good solvents described above are as follows; methylene chloride (boiling point of 40.4° C.), methyl acetate (boiling point of 56.32° C.), acetone (boiling point of 56.3° C.) and ethyl acetate (boiling point of 76.82° C.).

Among the above-described good solvent, methylene chloride or methyl acetate which has excellent solubility is preferably utilized.

In addition to the above-described organic solvent, 0.1-40 weight % of alcohol having a carbon number of 1-4 is preferably incorporated. It is specifically preferable to incorporate 5-30 weight % of the aforesaid alcohol. These are utilized as a gelation solvent which makes a web strong to be easily peeled off from a casting support when alcohol starts to be evaporated and a ratio of alcohol becomes large after the aforethe dope has been cast on a casting support, or also have a role to accelerate dissolution of cellulose ester by a non-chlorine type solvent when a ratio thereof is small.

Alcohol having a carbon number of 1-4 includes such as methanol, ethanol, n-propanol, iso-propanol, n-butanal, sec-butanol and tert-butanol.

Among these solvents, ethanol is preferable because of stability of a dope, a relatively low boiling point, drying capability and low toxicity. It is preferable to utilize 5-30 weight % of ethanol against 70-95 weights of methylene chloride. Methyl acetate can be also utilized instead of methylene chloride. In this case, a dope may be prepared by a cooling dissolution method.

In the case of utilizing cellulose ester film for the antireflection film of this invention, it is preferable to incorporate the following plastisizer. As a plastisizer, such as a phosphoric acid ester type plastisizer, a polyhydric alcohol type plastisizer, a phthalic acid ester type plastisizer, a trimellitic acid ester type plastisizer, a pyrromellitic acid type plastisizer, a glycolate type plastisizer, a citric acid ester type plastisizer, a polyester type plastisizer, a fatty acid ester type plastisizer and a polybasic carboxylic acid ester type plasticizer can be preferably utilized.

Among them, a polyhydric alcohol type plasticizer, a phthalic acid ester type plasticizer, a citric acid ester type plasticizer, a fatty acid ester type plastisizer, a glycolate type plastisizer and a polybasic carboxylic acid ester type plastisizer are preferable. Particularly, a polyhydric alcohol type plastisizer is preferably utilized because a hard coat layer having a pencil hardness of not less than 4H can be stably obtained.

Polyhydric alcohol type plastisizer is a plastisizer comprising ester of aliphatic polyhydric alcohol of not less than divalent with monocarboxylic acid; and is preferably provided with an aromatic ring or a cycloalkyl ring in a molecule. Aliphatic polyhydric alcohol ester of 2-20 valent is preferable.

Polyhydric alcohol preferably utilized in this invention is represented by following formula (I).

$$R_1\text{—(OH)}_n \qquad \text{Formula (I)}$$

Herein, R1 is an organic group of n valent; n is a positive integer of not less than 2; and an OH group is an alcoholic and/or phenolic hydroxyl group.

Examples of preferable polyhydric alcohol include the following; however, this invention is not limited thereto. Listed are adonitol, arabitol, ethylene glycol, diethylene glycol, triethylene glycol, tetraethylene glycol, 1,2-propanediol, 1,3- propanediol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol. Specifically preferable are triethylene glycol, tetraethylene glycol, dipropylene glycol, tripropylene glycol, sorbitol, trimethylolpropane and xylitol.

Carboxylic acid utilized for polyhydric alcohol ester of this invention is not specifically limited, and such as aliphatic monocarboxylic acid, alicyclic monocarboxylic acid and aromatic monocarboxylic acid can be utilized. Alicyclic monocarboxylic acid and aromatic monocarboxylic acid are preferable with respect to improving moisture permeability and retention property.

A preferable monocarboxylic acid includes the following; however, this invention is not limited thereto.

As aliphatic monocarboxylic acid, fatty acid provided with a straight chain or side chain having a carbon number of 1-32 can be utilized. The carbon number is more preferably 1-20 and specifically preferably 1-10. It is preferable to incorporate acetic acid because of increased compatibility with cellulose ester and it is also preferable to utilize acetic acid with other monocarboxylic acid in combination.

Preferable aliphatic monocarboxylic acid includes saturated fatty acid such as acetic acid, propionic acid, butyric acid, valeric acid, capronic acid, enanthic acid, caprylic acid, peragonic acid, capric acid, 2-ethyl-hexanoic acid, undecylic acid, lauric acid, dodecylic acid, myristic acid, pentadecylic acid, palmitic acid, heptadecylic acid, stearic acid, nonadecanoic acid, arachidic acid, behenic acid, lignoceric acid, cerotic acid, heptacosanoic acid, montanic acid, melissic acid and lacceric acid; and unsaturated fatty acid such as undecylenic acid, oleic acid, sorbic acid, linoleic acid, linolenic acid and arachidonic acid.

Examples of preferable alicyclic monocarboxylic acid include cyclopentane carboxylic acid, cyclohexane carboxylic, acid, cyclooctane carboxylic acid or derivatives thereof.

Examples of preferable aromatic monocarboxylic acid include those in which an alkyl group is introduced to the benzene ring of benzoic acid such as benzoic acid and toluoylic acid; aromatic monocarboxylic acid having not less than two benzene rings such as biphenyl carboxylic acid, naphthalene carboxylic acid and tetralin carboxylic acid; or derivatives thereof. Specifically preferable is benzoic acid.

A molecular weight of polyhydric alcohol ester is not specifically limited, however, is preferably 300-1,500 and more preferably 350-750. It is preferable that the ester becomes hardly volatile when the molecular weight is the larger, while it is preferable that the molecular weight is the smaller with respect to moisture permeability and compatibility with cellulose ester.

Carboxylic acid utilized for polyhydric alcohol ester may be either one type or not less than two types. Further, OH groups in polyhydric alcohol may be all esterified or partly remained as an OH group as it is.

In the following, specific examples of polyhydric alcohol ester will be shown.

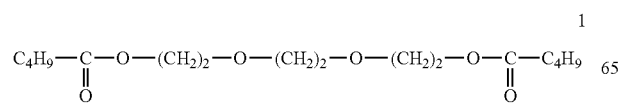

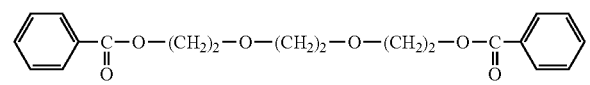

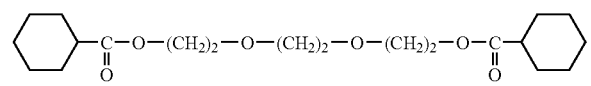

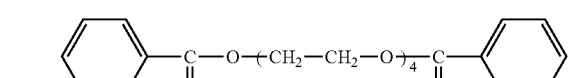

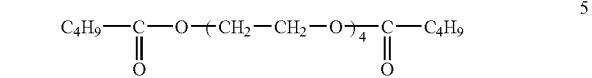

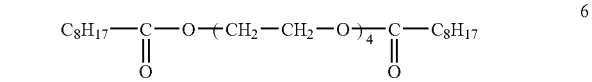

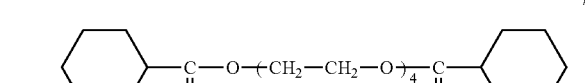

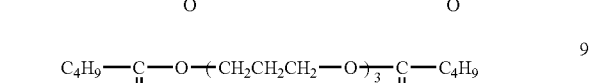

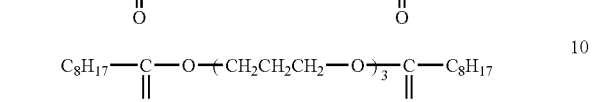

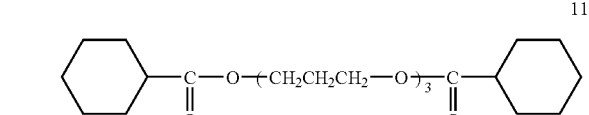

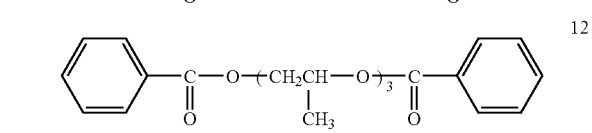

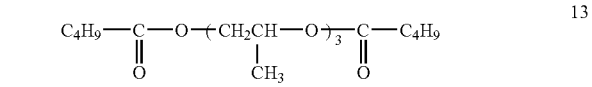

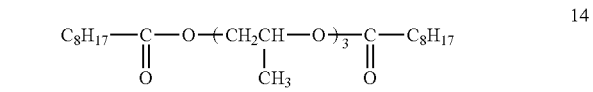

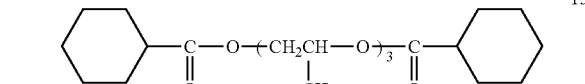

16
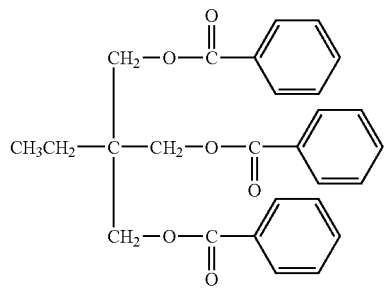
17
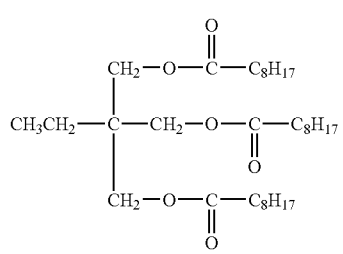
18
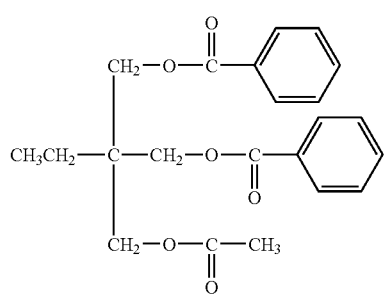
19
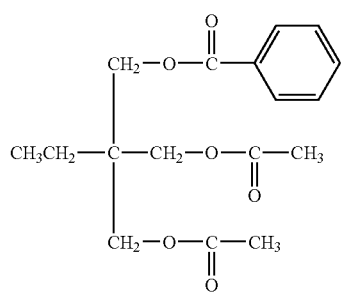
20
21
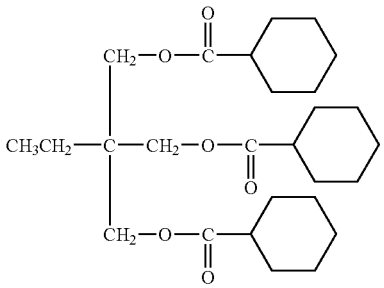
22
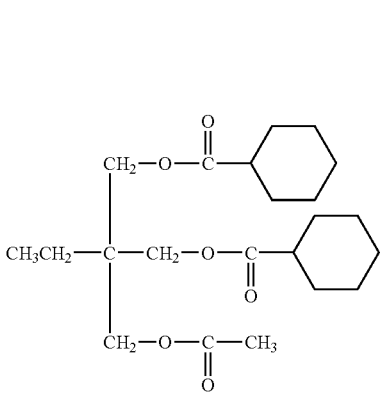
23
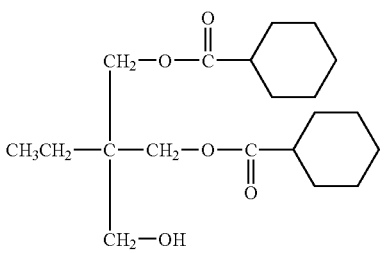
24
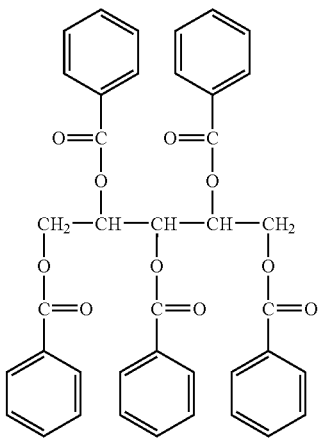

-continued
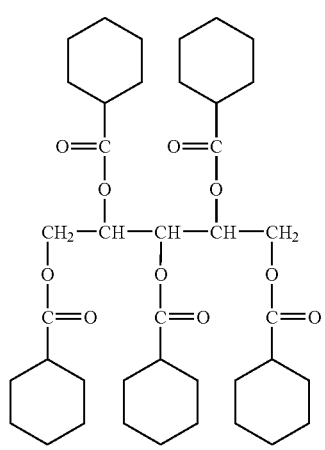
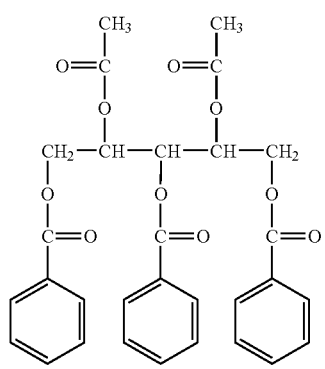
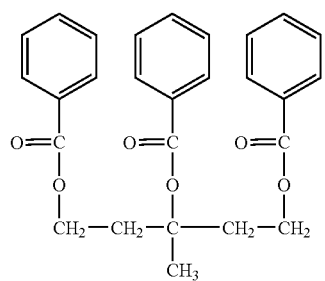
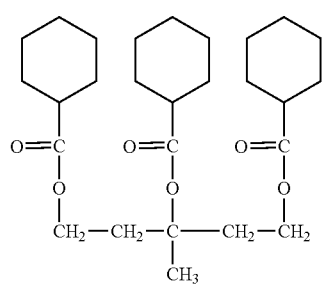
-continued
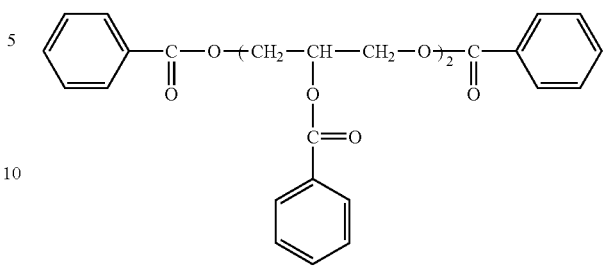
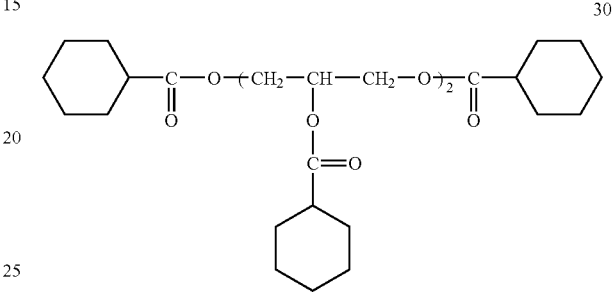
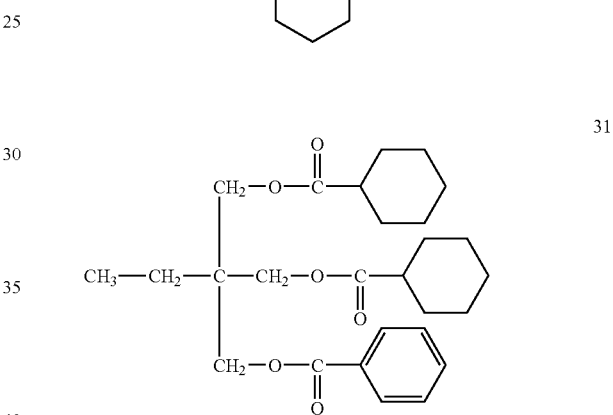
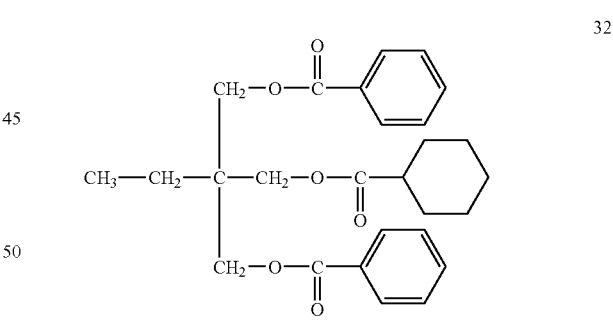
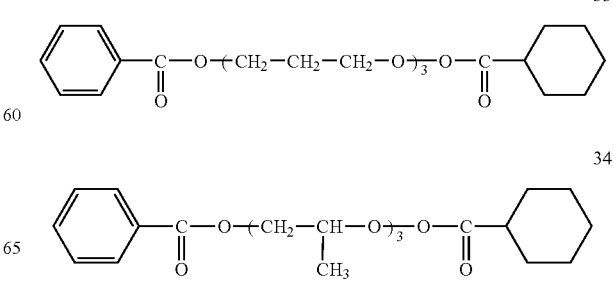

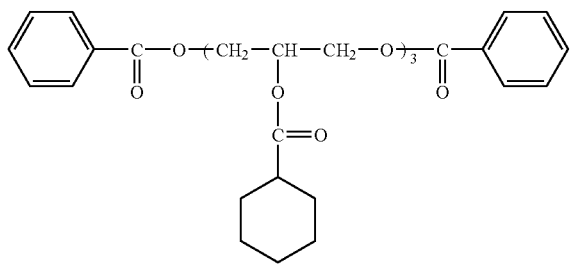

Glycolate type plasticizer is not specifically limited, and alkylphthalyl alkylglycolates are preferably utilized. Alkylphthalyl alkylglycolates include such as methylphthalyl methylglycolate, ethylphthalyl ethylglycolate, propylphthalyl propylglycolate, butylphthalyl butylglycolate, octylphthalyl octylglycolate, methylphthalyl ethylglycolate, ethylphthalyl methylglycolate, ethylphthalyl propylglycolate, methylphthalyl butylglycolate, ethylphthalyl butylglycolate, butylphthalyl methylglycolate, butylphthalyl ethylglycolate, propylphthalyl butylglycolate, butylphthalyl propylglycolate, methylphthalyl octylglycolate, ethylphthalyl octylglycolate, octylphthalyl methylglycolate and octylphthalyl ethylglycolate.

Phthalic acid type plastisizer includes such as diethyl phthalate, dimethoxyethyl phthalate, dimethyl phthalate, dioctyl phthalate, dibutyl phthalate, di-2-ethylhexyl phthalate, dioctyl phthalate, cyclohexyl phthalate and dicyclohexyl terephthalate.

Citric acid type plastisizer includes such as acetyltrimethyl citrate, actyltriethyl citrate and acetyltributyl citrate.

Fatty acid ester type plastisizer includes such as butyl oleate, methylacetyl ricinolate and dibutyl sebacate.

Polycarboxylic acid ester type plastisizer can be also preferably utilized. Specifically, polycarboxylic acid ester described in paragraph Nos. [0015]-[0020] of JP-A 2002-265639 is preferably incorporated as one of a plastisizer.

Further, phosphoric acid ester type plastisizer as another plastisizer can be also utilized and includes such as triphenyl phosphate, tricresyl phosphate, cresyldiphenyl phosphate, octyldiphenyl phosphate, diphenylbiphenyl phosphate, trioctyl phosphate and tributyl phosphate.

The total content of plasticizers in cellulose ester film is preferably 5-20 weight %, more preferably 6-16 weight % and specifically preferably 8-13 weight %, against the total solid content. Further, contents of two types of plastisizers each are at least 1 weight % and preferably not less than 2 weight %.

A polyhydric alcohol ester plastisizer is preferably contained at 1-12 weights and specifically at 3-11 weight % Flatness deteriorates when it is too little, while bleed out is easily cased when it is excessively much. A weight ratio of a polyhydric alcohol ester plastisizer to other plastisizers is preferably in a range of 1/4-4/1 and more preferably of 1/3-3/1. It is not preferable because film is liable to be deformed when an addition amount of a plastisizer is excessively much or excessively little.

In the antireflection film of this invention, an ultraviolet absorbent is preferably utilized.

As an ultraviolet absorbent, preferable are those having small absorption of visible light of not shorter than a wavelength of 400 nm with respect to excellent absorption capability of ultraviolet rays of not longer than a wavelength of 370 nm and superior liquid crystal displaying ability.

Specific examples of an ultraviolet absorbent preferably utilized in this invention include such as an oxybenzophenone type compound, a benzotriazole type compound, a salicylic acid ester type compound, a benzophenone type compound, a cyanoacrylate type compound, a triazine type compound and a nickel complex salt type compound, however, this invention is not limited thereto.

As a benzotriazole type ultraviolet absorbent, for example, the following ultraviolet absorbents are listed as specific examples; however, this invention is not limited thereto.

UV-1: 2-(2'-hydroxy-5'-methylphenyl)benzotriazole
UV-2: 2-(2'-hydroxy-3',5'-di-tert-butylphenyl benzotriazole
UV-3: 2-(2'-hydroxy-3'-tert-butyl-5'-methylphenyl)benzotriazole
UV-4: 2-(2'-hydroxy-3',5'-di-tert-butylphenyl)-5-chlorobenzotriazole
UV-5: 2-(2'-hydroxy-3'-(3'',4'',5'',6''-tetrahydrophthalimidomethyl)-5'-methylphenyl)benzotriazole
UV-6: 2,2-methylenebis-(4-(1,1,3,3-tetramethylbutyl)-6-(2H-benzotriazole-2-yl)phenol)
UV-7: 2-(2'-hydroxy-3'-tert-butyl-5'-methylphenyl)-5-chlorobenzotriazole
UV-8: 2-(2H-benzotriazole-2-yl)-6-(straight chain and side chain dodecyl)-4-methylphenol (Tinuvin171, manufactured by Ciba Specialty Chemicals)
UV-9: A mixture of octyl-3-[3-tert-butyl-4-hydroxy-5-(5-chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate (Tinuvin109, manufactured by Ciba Specialty Chemicals)

Further, as a benzophenone type ultraviolet absorbent, the following specific examples will be listed, however, this invention is not limited thereto.

UV-10: 2,4-dihydroxybenzophenone
UV-11: 2,2'-dihydroxy-4-methoxybenzophenone
UV-12: 2-hydroxy-4-methoxy-5-sulfobenzophenone
UV-13: bis(2-methoxy-4-hydroxy-5-benzoylphenymethane)

As an ultraviolet absorbent preferably utilized in this invention, a benzotriazole type ultraviolet absorbent or a benzophenone type ultraviolet absorbent, which exhibits high transparency, an excellent effect of preventing deterioration of a polarizing plate and a liquid crystal, is preferable, and a benzotriazole type ultraviolet absorbent, which exhibits less unnecessary tinting, is specifically preferably utilized.

Further, an ultraviolet absorbent having a coefficient of distribution of not less than 9.2 described in JP-A 2001-187825 can improve the surface quality of long length film and is excellent in coating behavior. It is specifically preferable to utilize an ultraviolet absorbent having a coefficient of distribution of not less than 10.1.

Further, polymer ultraviolet absorbents (or ultraviolet absorbing polymer) represented by formulas (1) and (2) of JP-A 6-148430 and formulas (3), (6) and (7) of Japanese Patent Application No. 2000-156039 are also preferably utilized. As a polymer ultraviolet absorbent, such as PUVA-30M (manufactured by Otsuka Chemical Co., Ltd.) is available on the market.

Further, micro-particles similar to those described in a coating layer containing actinic ray curable resin can be utilized to provide cellulose ester film utilized in this invention with a sliding property.

(Micro-Particles)

Cellulose ester film preferably contains micro-particles.

Micro-particles include silicon dioxide, titanium dioxide, aluminum oxide, zirconium oxide, calcium carbonate, magnesium carbonate, talc, clay, burned kaolin, burned calcium silicate, calcium silicate hydrate, aluminum silicate, magnesium silicate and calcium phosphate, as examples of an inorganic compound. Micro-particles are preferably those containing silicon with respect to decreased turbidity, and silicon dioxide is specifically preferable.

A mean particle size of primary particles of micro-particles is preferably 5-50 nm, and more preferably 7-20 nm. These are preferably incorporated mainly as secondary aggregate having a particle size of 0.05-0.3 μm. The content of these micro-particles in cellulose ester film is preferably 0.05-1 weight %. In the case of cellulose ester film having a multi-layer constitution by means of a co-casting method, micro-particles of this addition amount are preferably incorporated on the surface.

Micro-particles of silicon dioxide are available on the market under product names of such as Aerosil R972, R972V, R974, R812, 200, 200V, 300, R202, OX50 and TT600 (manufactured by Nippon Aerosil Co., Ltd.), which can be utilized.

Micro-particles of zirconium dioxide are available on the market under product names of such as Aerosil R976 and R811 (manufactured by Nippon Aerosil Co., Ltd.), which can be utilized.

Polymer can be also utilized as micro-particles, and as an example of polymer includes silicone resin, fluorine resin and acrylic resin. Silicone resin is preferable and those having a three dimensional net work structure are specifically preferable, which are available on the market under product names of such as Tospearl 103, 105, 108, 120, 145, 3120 and 240 (manufactured by Toshiba Silicone Co., Ltd.) and can be utilized.

Among them, Aerosil 200 V and Aerosil R972V are specifically preferably utilized because of a large effect to decrease a friction factor while keeping low turbidity of cellulose ester film. Cellulose ester film utilized in this invention is preferably has a friction factor of the back surface of a hard coat layer of not more than 1.0.

(Manufacturing Method of Cellulose Ester Film)

Next, a manufacturing method of cellulose ester film will be explained.

Manufacturing of cellulose ester film is conducted by a process to dissolve cellulose ester and additives in a solvent to prepare a dope, a process to cast a dope on a metal support of a belt form or a drum form, a process to dry the dope cast as a web, a process to peel off the web from the metal support, a process of stretching or width maintaining, a process of further drying, and a process to wind up finished film.

A process to prepare a dope will be now described. It is preferable that a drying load after casting on a metal support is decreased when a concentration of cellulose ester in a dope is the larger, however, a load at the time of filtering increases to deteriorate filtering precision when a concentration of cellulose ester is excessively large. A concentration for compatibility thereof is preferably 10-35 weight % and more preferably 15-25 weight %.

A solvent in a dope may be utilized alone or in combination of at least two types, however, it is preferable to utilize a good solvent and a poor solvent of cellulose ester by mixing with respect to production efficiency and to utilize a more good solvent with respect to solubility of cellulose ester. A preferable range of a mixing ratio of a good solvent to a poor solvent is 70-98 weight % of a good solvent to 2-30 weight % of a poor solvent. As for a good solvent and a poor solvent, a solvent independently dissolves utilized cellulose ester is defined as a good solvent and a solvent independently swells or does not dissolve cellulose ester is defined as a poor solvent. Therefore, a good solvent and a poor solvent will change depending on a substitution degree of an acyl group, and for example, when utilizing acetone as a solvent, it will be a good solvent in the case of acetic acid ester of cellulose, having an acetyl substitution degree of 2.4, and cellulose acetate propionate while it will be a poor solvent in the case of acetic acid ester of cellulose having an acetyl substitution degree of 2.8.

A good solvent utilized in this invention is not specifically limited, and includes organic halogen compounds such as methylene chloride, dioxanes, acetone, methyl acetate and methyl acetoacetate. Methylene chloride or methyl acetate is specifically preferable.

A poor solvent utilized in this invention is not specifically limited and such as methanol, ethanol, n-butanol, cyclohexane and cyclohexanone are preferably utilized. Further, 0.01-2 weight % of water is preferably contained in a dope.

As a dissolution method of cellulose ester at the time of preparation of the above-described dope, an ordinary method can be employed. Heating over a boiling point at ordinary pressure is possible by combining heat and pressure. When dissolution with stirring is performed while being heated at a temperature not lower than a boiling point of a solvent at ordinary pressure and not to boil a solvent under increased pressure, it is preferable to prevent generation of un-dissolved substances of a lamp form called as gel or un-soaked solid. Further, preferably utilized is a dissolution method, in which further a good solvent is added after cellulose ester having been mixed with a poor solvent to be wetted or swollen.

Pressure application may be conducted by a method to introduce an inert gas such as nitrogen with pressure or a method to raise vapor pressure of a solvent by heating. Heating is preferably performed from outside, and for example, a jacket type vessel is preferable with respect to easy control of temperature.

Heating temperature with addition of a solvent is preferably the higher with respect to dissolution ability of cellulose ester; however, a required pressure becomes high to deteriorate productivity when the temperature is excessively high. Heating temperature is preferably 45-120° C., more preferably 60-110° C. and furthermore preferably 70-105° C. Further, pressure is adjusted not as to boil a solvent at the set temperature.

Further, a cooling dissolution method is also preferably employed, and cellulose ester can be dissolved in a solvent such as methyl acetate.

Next, this cellulose ester solution is filtered by use of a suitable filter. As a filtering material, an absolute filtering precision is preferably the smaller to eliminate insoluble matter; however, there is a problem of easy clogging of a filtering material when an absolute filtering precision is excessively small. Therefore, an absolute filtering precision of a filtering material is preferably not more than 0.008 mm, more preferably 0.001-0.008 mm and furthermore preferably 0.003-0.006 mm.

A material of a filter is not specifically limited and ordinary filter can be utilized, however, a filter made of plastic such as polypropylene and Teflon (a registered trade mark) or a filter made of metal such as stainless steel is preferable because of no falling out of fibers. It is preferable to remove and decrease impurities, particularly bright spot foreign materials, contained in a mother material of cellulose ester by filtering.

A bright spot foreign material refers to a spot (a foreign material) visible by light leakage from the opposite side when two polarizing plates are arranged in a crossed nicol state to sandwich cellulose ester film, light being irradiated from one polarizing plate and being observed from the other polarizing plate side; and it is preferable that number of bright spots having a diameter of not less than 0.01 mm is not more than 200 spots/cm². It is more preferably not more than 100 spots/cm² and furthermore preferably 0-10 spots/cm². Further, it is also preferable that the smaller is the number of bright spots of not larger than 0.01 mm.

Filtering of a dope can be conducted by an ordinary method; however, preferable is a method to conduct filtering while heating at a temperature range of not lower than a boiling point of a solvent under an ordinary pressure but not to boil the solvent because of small increase of a difference of filtering pressures of before and after filtering (referred to as a pressure difference). Preferable temperature is 45-120° C., more preferably 45-70° C. and furthermore preferably 45-55° C.

Filtering pressure is preferably the smaller. Filtering pressure is preferably not higher than 1.6 MPa, more preferably not higher than 1.2 MPa and furthermore preferably not higher than 1.0 MPa.

Casting of a dope will now be explained.

A metal support in a cast process is preferably one the surface of which has been mirror polished, and a stainless steel belt or a drum the surface of which is plating finished with a mold is preferably utilized as a metal support. A casting width can be set to 1-4 m. The surface temperature of a metal support is set to a temperature of not lower than −50° C. and not higher than a temperature to boil a solvent to cause foaming. The temperature is preferably the higher because a drying rate of a web can be increased, however, a web may be cause foaming or the surface of a web may be deteriorated when it is excessively high. A preferable support temperature is appropriately determined at 0-100° C., and more preferably at 5-30° C. Further, it is also a preferable method to make a web gelled by cooling and to peel off a web in a state of containing a plenty of a residual solvent. A method to control the support temperature is not specifically limited, and a method to blow a hot wind or a cold wind and a method to bring a hot water in contact with the back side of a metal support can be employed. It is preferable to use hot water because time to make metal support reach a predetermined temperature is short due to efficient heat transmission. In the case of employing a hot wind, a wind having a temperature higher than an aimed temperature may be utilized, while employing a hot wind having a temperature of higher then a boiling point of a solvent and preventing foaming, in consideration of temperature decrease of a web due to latent heat of vaporization. Particularly, it is preferable to efficiently perform drying by varying temperatures of a support and a drying wind between casting and peeling off.

To provide an excellent surface property of cellulose ester film, a residual solvent amount at the time of peeling off a web from a metal support is preferably 10-150 weight %, more preferably 20-40 weight % or 60-130 weight % and specifically preferably 20-30 weight % or 70-120 weight %.

In this invention, a residual solvent amount is defined by the following equation Residual solvent amount(weight %)=$\{(M-N)/N\}\times 100$ Herein, M is a weight of a sample picked up at an arbitrary time during manufacturing or after manufacturing of a web or film, and N is a weight of M after having been heated at 115° C. for 1 hour.

Further, in a drying process of cellulose ester film, a web is preferably peeled off from a metal support followed by further being dried to make a residual solvent amount of not more than 1 weight %, more preferably not more than 0.1 weight % and specifically preferably not more than 0-0.01 weight %.

In a film drying process, generally adopted is a method to dry a web while being conveyed by means of a roll drying method (a method to alternately pass a web through many rolls arranged up and down to be dried) or a tenter method.

To prepare cellulose ester film for the antireflection film of this invention, it is specifically preferable to stretch a web immediately after peeled off from a metal support and having a plenty of a residual solvent in the transport direction and further stretch a web in the width direction by a tenter method to hold the both edges of the web with such as clips. A stretching magnification is preferably 1.01-1.3 times in both of the longitudinal direction and the width direction and more preferably 1.05-1.15 times. It is preferable to make the area of 1.12-1.44 times and more preferably 1.15-1.32 times, as a result of stretching in the longitudinal and width directions. This can be determined by (a stretching magnification in the longitudinal direction)×(a stretching magnification in the width direction). When either of stretching magnification in the longitudinal direction or in the width direction is less than 1.01 times, flatness is liable to be deteriorated due to ultraviolet ray irradiation at the time of forming a hard coat layer.

To stretch in the longitudinal direction immediately after peeling off, it is preferable to conduct stretching by peeling off tension or transporting tension thereafter. For example, peeling off with a peeling off tension of not less than 210 N/m and specifically preferably of 220-300 N/m.

A method to dry a web is not specifically limited and such as a hot wind, infrared rays, a heated roll and microwaves can be generally applied. It is preferable to apply a hot wind with respect to simplicity.

Drying temperature in a web drying process is preferably gradually raised in a range of 30-160° C., and to stepwise raise in a range of 50-160° C. is more preferable to improve dimension stability.

Layer thickness of cellulose ester film is not specifically limited; however, 10-20.0 μm is preferably applied. Particularly, with thin film having a thickness of 10-70 μm, it has been difficult to prepare the antireflection film having excellent flatness and abrasion resistance, however, cellulose ester film having a thickness of 10-70 μm is specifically preferable because the antireflection film having excellent flatness and abrasion resistance as well as exhibiting good productivity can be prepared according to this invention. It is more preferably 20-60 μm and most preferably 35-60 μm. Further, cellulose ester film having a multilayer constitution by a co-extrusion method is also preferably utilized. Even in cellulose ester having a multilayer constitution, provided is a layer containing an ultraviolet absorbent and a plasticizer, which may be a core layer, a skin layer or the both thereof.

As the antireflection film of this invention, one having a width of 1.4-4 m is preferably utilized. A roll film having a length of 300-5,000 m is preferred, and the length is specifically preferably 1,000-4,000 m. Further, a center line roughness (Ra) of the surface of cellulose ester film, on which a hard coat layer is provided, is preferably 0.001-1 μm.

Illuminance unevenness of irradiation light at the time of ultraviolet curing cannot be neglected to cause hardness unevenness in addition to flatness deterioration when a width of cellulose ester film becomes large, and there was a problem of significant reflection unevenness when an antireflection layer is formed thereon. Since the antireflection film of this invention can achieve sufficient hardness with a small irradiation quantity, the antireflection film which barely generates hardness unevenness along the width direction even with unevenness of irradiation quantity along the width direction and which has an excellent flatness can be prepared; therefore, a significant effect is observed with cellulose ester film having a wide width. One having a width of 1.4-4 m is preferably utilized and specifically preferable width is 1.4-3 m. Transportation becomes difficult when the width exceeds 4 m.

(Polarizing Plate)

A polarizing plate of this invention will now be explained.

A polarizing plate can be prepared by an ordinary method. The back surface side (the side without an antireflection layer) of the antireflection film of this invention or the back surface side of hard coat film of this invention (the side without a hard coat layer) is subjected to an alkaline saponification treatment. The antireflection film or the hard coat film having been subjected to a saponification treatment is preferably laminated on at least one surface of polarizer film, which has been prepared by immersing polyvinyl alcohol film into an iodine solution, by use of a completely saponificated polyvinyl alcohol aqueous solution. Also on the other surface, either the antireflection film or hard coat film may be utilized, or other polarizing plate protective film may be utilized. Preferable examples of polarizing plate protective film utilized on the other surface against the antireflection film or the hard coat film of this invention include cellulose ester film having retardation Ro in the plane at 590 nm of 0-10 nm and Rt of −30-30 nm, or cellulose ester film described in JP-A 2003-12859. Further, the polarizing plate protective film also preferably functions as phase difference film or optical compensation films and is preferably optical compensation film having phase difference as a retardation in the plane Ro of 20-70 nm and Rt of 100-400 nm at 590 nm. For example, these can be prepared by a method described in JP-A 2002-71957 and Japanese Patent Application No. 2002-155395. Further, preferably utilized is polarizing plate protective film combining optical compensation film which is provided with an optical anisotropic layer formed by orienting a liquid crystal compound such as a discotic liquid crystal. For example, an optical anisotropic layer can be formed by a method described in JP-A 2003-98348. By combination use with the antireflection film of this invention, prepared can be a polarizing plate which is excellent in flatness and has a stable viewing angle enlargement effect.

As polarizing plate protective film utilized on the back surface side, such as KC8UX, KC4UX, KC5UX, KC8UCR3, KC8UCR4, KC8UCR5, KC8UY, KC4UY, KC12UR, KC4FR-1, KC8UE and KC413E (manufactured by Konicaminolta Opto, Inc.) are preferably utilized as cellulose ester film available on the market.

As for a layer thickness of polarizing plate protective film utilized on the antireflection film side and a layer thickness of polarizing plate protective film utilized on the back surface side, either those having same layer thickness may be utilized in combination or polarizing plate protective films having different layer thicknesses, that is, such as a layer thickness of 80 μm for polarizing plate protective film on the antireflection film side and a layer thickness of 40-60 μm for polarizing plate protective film on the back surface side, may be utilized in combination to constitute a polarizing plate.

Polarizer film as a primary constituent element of a polarizing plate is an element which transmits a polarized wave plane of a fixed direction, and typical polarizer film known at present is polyvinyl alcohol type polarizer film, which includes polyvinyl alcohol film dyed with iodine and one dyed with a dichroic dye, however, not limited thereto. As polarizer film, utilized are those comprising polyvinyl alcohol aqueous solution is made into film, followed by being uni-axially stretched and dyed, or followed by being uni-axially stretched after being dyed, and then preferably subjected to a durability improving treatment with a boron compound. Layer thickness of polarizer film is 5-30 μm and preferably 8-15 μm. One surface of the antireflection film of this invention is laminated up on the surface of the polarizer film to form a polarizing plate. The lamination is conducted by use of a water-based adhesive comprising such completely saponificated polyvinyl alcohol as a primary component.

(Display Apparatus)

By arranging the antireflection film surface or the hard coat surface of a polarizing plate of this invention on the viewing surface side of a display apparatus, a display apparatus superior in various visual recognition characteristics can be prepared. The antireflection film of this invention is preferably utilized in a reflection type, a transmission type or a translucent type LCD, and in a LCD of various driving types such as a TN type, a STN type, an OCB type, a HAN type, a VA type (a PVA type, a MVA type) and IPS type. Further, the antireflection film of this invention exhibits very little color shading of reflective light of an antireflection layer, low reflectivity and excellent flatness; and is also preferably utilized in various display apparatuses such as a plasma display, a field emission display, an organic EL display, an inorganic EL display and an electronic paper device. Particularly, in a display apparatus having a large image plane of not smaller than 30 inch type, there is an effect of little color shading or ripple defects as well as little irritation of eyes even at viewing for long hours.

EXAMPLES

In the following, this invention will be specifically explained in reference to examples, however, is not limited thereto. Herein, "part(s)" or "%", which will be described in examples, represents "weigh part(s)" or "weight %", unless otherwise mentioned.

Example 1

Coating of Hard Coat Layer

Triacetyl cellulose film of a roll form (a length of 3,000 m) having a thickness of 80 μm (product name: KC8UX2M, manufactured by Konicaminolta Opto, Inc.) was unwound as a transparent resin film, the following hard coat layer coating solution being die-coated at a coating width of 1.4 m, followed by being dried at 80° C., and then ultraviolet rays were irradiated at 120 mJ/cm$^2$ with a high pressure mercury lamp to make a layer thickness after curing of 6 μm, whereby a hard coat layer was formed.

| (Hard Coat Layer Coating Solution) | |
|---|---|
| Acetone | 45 weight parts |
| Ethyl acetate | 45 weight parts |
| PGME (propylene glycol monomethyl ether) | 10 weight parts |
| Pentaerythritol triacrylate | 30 weight parts |
| Pentaerythritol tetraacrylate | 45 weight parts |
| Urethane acrylate (product name: U4HA, manufactured by Shin-Nakamura Chemical Co., Ltd.) | 25 weight parts |
| 1-hydroxy-cyclohexyl-phenyl-ketone (Irgacure 184, manufactured by Ciba Specialty Chemicals Corp.) | 5 weight parts |
| 2-methyl-1-[4-(methylthio)phenyl]-2-morpholino-1-one (Irgacure 907, manufactured by Ciba Specialty Chemicals Corp.) | 3 weight parts |
| BYK-331 (silicone surfactant, manufactured by BYK-Chemie Japan Co., Ltd.) | 0.2 weight parts |

[Coating of Back Coat Layer]

The following back coat layer coating solution was die-coated on the side opposite to the surface, on which the above-described hard coat layer had been coated, so as to make a wet layer thickness of 14 μm, followed by being dried and wound up to prepare hard coat film of a roll form.

| (Back Coat Layer Coating Solution) | |
|---|---|
| Diacetyl cellulose (acetyl group substitution degree of 2.4) | 0.2 weight parts |
| Acetone | 35 weight parts |
| Methanol | 30 weight parts |
| Methyl ethyl ketone | 35 weight parts |
| Micro-particle silica Aerosil 200V (manufactured by Nippon Aerosil Co., Ltd.) 2% acetone solution | 0.12 weight parts |

Hard coat films 2-30 described in table 1 were prepared in a similar manner to preparation of hard coat film 1, except that surfactant BYK-331 (0.2 weight parts) was replaced by compounds and addition amounts described in table 1.

Next, a blocking property of prepared hard coat films 1-30 was evaluated.

[Evaluation of Hard Coat Film]

(Blocking Property).

A 3,000 m roll of hard coat film prepared above was kept in a thermostat of 30° C. and relative humidity of 80% for 2 days. Next, a blocking property after storage was evaluated based on the following criteria by means of visually observation from the surface. The results will be shown in table 1.

A: The blocking area is 0%, and no blocking is observed.

B: The blocking area is less than 2%, and slight blocking is observed.

C: The blocking area is not less than 2% and less than 10%, and there generates some blocking which is not problematic in practical use.

D: The blocking area is not less than 10% and less than 40%, and there generates blocking.

E: The blocking area is not less than 40%, and it is significantly problematic in practical use.

[Preparation of Antireflection Film]

The above-described hard coat film of a roll form, which had been kept for 5 days in a thermostat under 30° C. and a relative humidity of 80%, was unwound again to be coated with a medium refractive index layer and successively a low refractive index layer in this order, which constitute an antireflection layers in the following manner, whereby antireflection layer was prepared.

(Coating of Medium Refractive Index Layer)

On the surface of a hard coat layer, the following medium refractive index layer coating solution was die-coated, followed by being dried and then irradiated with ultraviolet rays at 120 mJ/cm$^2$ by use of a high pressure mercury lamp, whereby a medium refractive index layer was formed so as to make a layer thickness after curing of 120 nm. The refractive index was 1.60.

<Medium Refractive Index Layer Coating Solution>

<Preparation of Particle Dispersion A>

Methanol dispersed antimony complex oxide colloid (solid content of 60%, zinc antimonate sol, product name: Serunax CX-Z610M-F2, manufactured by Nissan Chemical Industries, Ltd.) of 6 kg was gradually added with 12.0 kg or isopropyl alcohol with stirring, whereby particle dispersion A was prepared.

| | |
|---|---|
| PGME (propylene glycol monomethyl ether) | 40 weight parts |
| Isopropyl alcohol | 25 weight parts |
| Methyl ethyl ketone | 25 weight parts |
| Pentaerythritol triacrylate | 0.9 weight parts |
| Pentaerythritol tetraacrylate | 1.0 weight parts |
| Urethane acrylate (product name: U4HA, manufactured by Shin-Nakamura Chemical Co., Ltd.) | 0.6 weight parts |
| Particle dispersion A | 20 weight parts |
| 1-hydroxy-cyclohexyl-phenyl-ketone (Irgacure 184, manufactured by Ciba Specialty Chemicals Corp.) | 1.5 weight parts |
| 2-methyl-1-[4-(methylthio)phenyl]-2-morpholinopropane-1-one (Irgacure 907, manufactured by Ciba Specialty Chemicals Corp.) | 0.2 weight parts |
| 10% propylene glycol monomethyl ether solution of FZ-2270 (manufactured by Nippon Unicar Co., Ltd.) | 0.4 weight parts |

(Coating of Low Refractive Index Layer)

On the above-described medium refractive index layer, the following low refractive index coating solution was die-coated, followed by being dried and irradiated with ultraviolet rays at 120 mJ/cm$^2$ by use of a high pressure mercury lamp to form a low refractive index layer having a layer thickness of 80 nm r whereby the antireflection film was prepared. The refractive index was 1.38.

(Low Refractive Index Layer Coating Solution)

<Preparation of Tetraethoxysilane Hydrolyzate A>

Tetraethoxysilane of 230 g (product name: KBE04, manufactured by Shin-Etsu Chemical Co., Ltd.) and 440 g of ethanol were mixed, the resulting mixture being added with 120 g of 2% acetic acid aqueous solution, then being stirred at room temperature (25° C.) for 26 hours, whereby tetraethoxysilane hydrolyzate A was prepared.

| | |
|---|---|
| Propylene glycol monomethyl ether | 430 weight parts |
| Isopropyl alcohol | 430 weight parts |
| Tetraethoxysilane hydrolysis product A | 120 weight parts |
| γ-methacryloxypropyl trimethoxysilane (product name: KBM503, manufactured by Shin-Etsu Chemical Co., Ltd.) | 3.0 weight parts |
| Isopropyl alcohol dispersed hollow silica sol (solid content of 20%, product name: ELCOM V-8209, silica sol, manufactured by Catalyst & Chemicals Ind. Co., Ltd.) | 2.0 weigh parts |
| Aluminum ethylacetoacetate•diisopropylate (ALCH, manufactured by Kawaken Fine Chmicals Co., Ltd.) | 3.0 weight parts |
| 10% propylene glycol monomethyl ether solution of FZ-2270 (manufactured by Nippon Unicar Co., Ltd.) | 3.0 weight parts |

[Evaluation of Antireflection Film]

(Evaluation of Visual Appearance)

The above-prepared antireflection film was cut into a size of 150 cm×50 cm, the back surface being subjected to an optical absorption treatment by use of a black color spray, and reflection of a fluorescent lamp was observed from the surface, whereby the visual appearance (spotty unevenness) was visually evaluated based on the following criteria. The results will be also shown in table 1.

(Visual Appearance: Spotty Unevenness)

A: No spotty unevenness is observed at all.

B: Slight spotty unevenness is observed.

C: Some spotty unevenness is observed.

D: Spotty unevenness is observed.

E: Significant spotty unevenness is observed.

(Adhesion)

The antireflection film was cut into a size of 3 cm×4 cm, light irradiation being applied from the surface of an antireflection layer for 120 hours by use of a weather tester (Eye Super UV Tester, manufactured by Iwasaki Electric Co. Ltd.), and then 100 pieces of grids of 1 mm square were formed by providing 11 lines of notches, which were formed by use of a single-edged razor blade at 90° against the surface, crosswise at an interval of 1 mm on the surface of the antireflection layer. A piece of cellophane tape available on the market was pasted up thereon, being peeled off by being strongly pulled in the vertical direction while holding the one end by a hand, and the ratio of an area where a thin layer had been peeled off from the notches against the tape area was visually observed, whereby the evaluation was made based on the following criteria. The result will be also shown in table 1.

A: No peel-off was observed.
B: The peeled-off area ratio was less than 5%.
C: The peeled-off area ratio was less than 10%.
D: The peeled-off area ratio was not less than 10%.

Megafac F-479: Perfluoroalkyl group•hydrophilic group•hydrophilic group containing oligomer (manufactured by Dainippon Ink & Chemicals, Inc.)

Emargen 108: Polyoxyethylene lauryl ether (manufactured by Kao Corp.)

Emargen 306P: Polyoxyethylene stearyl ether (manufactured by Kao Corp.)

Emargen 705: Polyoxyethylene higher alcohol ether (manufactured by Kao Corp.)

Emargen MS-110: Polyoxyalkylene alkyl ether (manufactured by Kao Corp.)

It is clear from the results of table 1 that samples added with polyoxyethylene oleyl ether and actinic ray curable resin exhibit excellent ability, compared to comparative samples added with a conventional noionic surfactant, or a fluorine or silicone surfactant, with respect to a blocking prevention effect, spotty unevenness and adhesion. Herein, when the state of repelling and missing on the surface of a hard coat layer of hard coat film was observed through a loupe having

TABLE 1

| Hard coat film/Antireflection film No. | Hard coat layer coating solution Surfactant (Addition amount) | Evaluation of hard coat film Blocking property | Evaluation of antireflection film Visual appearance (Spotty unevenness) | Adhesion | Remarks |
| --- | --- | --- | --- | --- | --- |
| 1 | BYK-331 (0.2 weight parts) | D | E | C | Comp. |
| 2 | BYK-331 (0.5 weight parts) | E | E | C | Comp. |
| 3 | BYK-331 (1.5 weight parts) | E | E | C | Comp. |
| 4 | Megafac F-482 (0.2 weight parts) | D | D | C | Comp. |
| 5 | Megafac F-482 (0.5 weight parts) | D | D | C | Comp. |
| 6 | Megafac F-482 (1.5 weight parts) | E | E | C | Comp. |
| 7 | BYK-UV3500 (0.2 weight parts) | D | E | C | Comp. |
| 8 | BYK-UV3500 (0.5 weight parts) | D | E | C | Comp. |
| 9 | BYK-UV3500 (1.5 weight parts) | D | E | C | Comp. |
| 10 | Megafac F-479 (0.5 weight parts) | E | E | C | Comp. |
| 11 | TSF4440 (0.5 weight parts) | D | D | C | Comp. |
| 12 | Emargen 404 (0.2 weigh parts) | A | A | A | Inv. |
| 13 | Emargen 404 (0.5 weigh parts) | A | A | A | Inv. |
| 14 | Emargen 404 (1.5 weigh parts) | A | B | A | Inv. |
| 15 | Emargen 408 (0.2 weigh parts) | A | A | A | Inv. |
| 16 | Emargen 408 (0.5 weigh parts) | A | A | A | Inv. |
| 17 | Emargen 408 (1.5 weigh parts) | A | B | A | Inv. |
| 18 | Emargen 420 (0.2 weigh parts) | B | B | B | Inv. |
| 19 | Emargen 420 (0.5 weigh parts) | B | B | B | Inv. |
| 20 | Emargen 420 (1.5 weigh parts) | B | B | B | Inv. |
| 21 | Emargen 430 (0.5 weigh parts) | B | B | B | Inv. |
| 22 | NOFABLEEAO-9905 (0.5 weight parts) | A | B | A | Inv. |
| 23 | Emargen 108 (0.2 weight parts) | D | D | C | Comp. |
| 24 | Emargen 108 (0.5 weight parts) | D | D | C | Comp. |
| 25 | Emargen 108 (1.5 weight parts) | D | E | C | Comp. |
| 26 | Emargen 306P (0.2 weight parts) | D | D | C | Comp. |
| 27 | Emargen 306P (0.5 weight parts) | D | E | C | Comp. |
| 28 | Emargen 306P (1.5 weight parts) | D | E | C | Comp. |
| 29 | Emargen 705 (1.5 weight parts) (0.5 weight parts) | D | D | C | Comp. |
| 30 | Emargen MS-110 (0.5 weight parts) | D | D | C | Comp. |

Comp.: Comparison,
Inv.: Invention

BYK-331: Polyether modified polydimethylsiloxane (manufactured by BYK Chemie Japan Co., Ltd.)

BYK-UV3500: Polydimethylsiloxane having a polyether modified acryl group (manufactured by BYK Chemie Japan Co., Ltd.)

TSF4440: Polyether modified silicone oil (manufactured by GE Toshiba Silicone Co., Ltd.)

Megafac F-482: Perfluoroalkyl group•hydrophobic group containing oligomer (manufactured by Dainippon Ink & Chemicals, Inc.)

a magnification of 50 times, no such as repelling and missing was observed at all resulting in a good coating behavior.

Example 2

Next, polarizing plates were prepared by use of antireflection films 1-30 in the following manner, and these polarizing plates were combined in a liquid crystal display panel (an image display apparatus) to evaluate visual recognition property.

According to the following method, polarizing plates 1-30 were prepared by use of each one sheet of antireflection films 1-30 and KC8UCR5 (manufactured by Konicaminolta Opto, Inc.) as cellulose ester type optical compensation film.

(a) Preparation of Polarizer Film

Polyvinyl alcohol (hereinafter, abbreviated as PVA), having a saponification degree of 99.95 mol % and a polymerization degree of 2,400, of 100 weight parts was impregnated with 10 weight parts of glycerin and 170 weight parts of water, and the resulting system was melt mixed, being subjected to defoaming, and then melt extruded from a T die on a metal roll to be formed into film. Then, PVA film was prepared by a drying•heat treatment. The prepared PVA film had a mean thickness of 40 μm, a moisture content of 4.4% and a film width of 3 m.

The aforesaid PVA film was successively subjected to treatments of preliminary swelling, dying, uniaxial stretching by a wet method, fixing, drying and heating, in this order, whereby polarizer film was prepared. PVA film was preliminary swelled by immersing into water at 30° C. for 30 seconds, and immersed in an aqueous solution having an iodine concentration of 0.4 g/liter and a potassium iodide concentration of 40 g/liter at 35° C. for 3 minutes. Successively, uniaxial stretching was performed in an aqueous solution having a boric acid concentration of 4% at 50° C. under a condition of a tension applied to film of 700 N/m, and a fixing treatment was performed by immersion in an aqueous solution having a potassium iodide concentration of 40 g/liter, a boric acid concentration of 40 g/liter and a zinc chloride concentration of 10 g/liter at 30° C. for 5 minutes. Thereafter, PVA film was picked out to be dried with a hot wind at 40° C., and then was subjected to a heat treatment at 100° C. for 5 minutes. The prepared polarizer film had a mean thickness of 13 μm; and a transmittance of 43.5%, a polarizing degree of 99.5% and a dichroic ratio of 40.1 as polarizing characteristics.

(b) Preparation of Polarizing Plate

Next, polarizing plates 1-30 were prepared by laminating polarizer film and polarizing plate protective film according to following processes 1-5.

Process 1: The optical compensation film and the antireflection film were immersed in a 2 mol/L sodium hydroxide aqueous solution at 60° C. for 90 seconds, followed by being washed with water and dried. The surface which is provided with an antireflection layer was protected by pasting up with protective film (made of PET) in advance.

Similarly, optical compensation film was immersed in a 2 mol/L sodium hydroxide aqueous solution at 60° C. for 90 seconds, followed by being washed with water and dried.

Process 2: The aforesaid polarizer film was immersed in a polyvinyl alcohol adhesive bath having a solid content of 2 weight % for 1-2 seconds.

Process 3: Polarizer film excess adhesive adhered on which in process 2 had been roughly wiped off, was sandwiched between optical compensation film and the antireflection film, which had been subjected to an alkaline treatment in process 1, to make an accumulated arrangement.

Process 4: Lamination was conducted with two rotating rollers at a pressure of 20-30 N/cm² and a speed of approximately 2 m/min. At this time, caution not to introduce bubbles was used.

Process 5: The sample prepared in process 4 was dried in a drier of 80° C. for two minutes to prepare a polarizing plate.

A polarizing plate on the outermost surface of a liquid crystal display panel available on the market (a VA type) was carefully peeled off, and polarizing plates 1-30 were laminated thereon with coincidence of their polarizing directions.

Liquid crystal panels 1-30 prepared in the above manner was placed on a desk having a height of 80 cm from the floor, and 10 sets of 40 W× two tubes of daylight straight tube fluorescent lamps (FLR40S•D/M-X, manufactured by Matsushita Electric Co., Ltd.) were arranged with 1.5 m intervals on the ceiling part of 3 m high from the floor. At this time, the aforesaid fluorescent lamps were arranged on the ceiling part backward from overhead of an evaluator when an evaluator is in front of the liquid crystal panel display surface. Viewing easiness (visual recognition property) of an image plane was evaluated based on the following ranking criteria when the liquid crystal panel was arranged so as to reflect the fluorescent lamps inclined at 25° from the vertical direction against the desk.

A: Reflection of the nearest fluorescent lamp is not displeasing and letters having a font size of not larger than 8 can be clearly read.

B: Reflection of nearest fluorescent lamps is somewhat displeasing, however, letters having a font size of not larger than 8 can be managed to be read.

C: Reflection of fluorescent lamps is displeasing, and letters having a font size of not larger than 8 are difficult to be read.

D: Reflection of fluorescent lamps is significantly displeasing, and letters having a font size of not larger than 8 cannot be read.

As a result of the evaluation, any liquid crystal panel which utilizes an antireflection film and a polarizing plate of this invention, showed an evaluation result of B or the better, and exhibits visual recognition property better than liquid crystal panels utilizing the comparative antireflection film and polarizing plate.

What is claimed is:

1. A multi-layer film, comprising:
   a transparent resin film;
   a hard coat layer provided on at least one side of the transparent resin film, and
   an antireflection layer provided on the hard coat layer and in contact with the surface of the hard coat layer;
   wherein the hard coat layer contains a polyoxyethylene oleyl ether compound and an actinic ray curable resin and the polyoxyethylene oleyl ether compound is represented by Formula I, and n is 2-9:

$$C_{18}H_{35}-O(C_2H_4O)_nH. \hspace{2cm} \text{Formula 1}$$

2. The multi-layer film described in claim 1,
   wherein the antireflection layer has a low refractive index layer.

3. The multi-layer film described in claim 2,
   wherein the low refractive index layer contains hollow silica type micro-particles.

4. A manufacturing method of the multi-layer film described in claim 1 comprising the steps of:
   (i) forming the hard coat layer by coating on one side of the transparent resin film,
   (ii) winding the coated film in a roll form, and
   (iii) unwinding again to coat the resin antireflection layer on the hard coat layer.

5. A multi-layer film being manufactured by the manufacturing method of the multi-layer film described in claim 4.

6. A polarizing plate, comprising:
   a polarizer; and
   the multi-layer film described in claim 1 on at least one side of the polarizer.

7. A display, comprising:
   the multi-layer film described in claim 1.

8. A polarized plate comprising the multi-layer film described in claim 5, on at least one side of a polarizer.

9. A display comprising the multi-layer film described in claim 5.

10. A display comprising the polarized plate described in claim 6.

11. The multi-layer film described in claim 1, wherein the antireflection layer includes a fluorine type surfactant, a silicone oil or a silicone surfactant.

12. The multi-layer film described in claim 1, wherein the antireflection layer includes metal oxide micro-particles.

13. The multi-layer film described in claim 1, wherein the addition amount of the polyoxyethylene oleyl ether compound is in a range of 0.1-8.0 weight % based on the actinic ray curable resin.

* * * * *